(12) United States Patent
Shimazu

(10) Patent No.: US 7,333,103 B2
(45) Date of Patent: Feb. 19, 2008

(54) CLIENT AND PROGRAM FOR IMPROVING THREE-DIMENSIONAL AIR EXCURSION AND METHOD THEREOF

(75) Inventor: Hideo Shimazu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/342,887

(22) Filed: Jan. 31, 2006

(65) Prior Publication Data
US 2006/0125821 A1    Jun. 15, 2006

Related U.S. Application Data

(62) Division of application No. 10/012,509, filed on Dec. 12, 2001, now Pat. No. 7,218,318.

(30) Foreign Application Priority Data
Dec. 14, 2000   (JP) ............................. 2000-380924

(51) Int. Cl.
*G06T 17/00* (2006.01)
(52) U.S. Cl. .................. 345/419; 345/426; 345/427
(58) Field of Classification Search ................ 345/426, 345/427, 419; 707/10
See application file for complete search history.

(56) References Cited

U.S. PATENT DOCUMENTS 5,652,717 A * 7/1997 Miller et al. ................. 703/6
5,864,632 A   1/1999 Ogawa et al.
6,208,939 B1 * 3/2001 Kunii ............................. 702/5
6,717,522 B1   4/2004 Nagatomo et al.

FOREIGN PATENT DOCUMENTS

| JP | 5-27677    | 2/1993 |
| JP | 9-101742   | 4/1997 |
| JP | 2756483    | 3/1998 |
| JP | 11-120374  | 4/1999 |

OTHER PUBLICATIONS

M. Wloka et al., "Resolving Occlusion in Augmented Reality," 1995 ACM, pp. 5-12.

* cited by examiner

Primary Examiner—Almis R. Jankus
(74) Attorney, Agent, or Firm—Foley & Lardner LLP

(57) ABSTRACT

In a server, a client for improving a three-dimensional air excursion and a method and programs thereof, a three-dimensional data can be automatically produced from aerial pictures or satellite images, and the three-dimensional air excursion on a three-dimensional solid map can be provided to a lot of users via the Internet. In the automatic producing of the three-dimensional image, a device for improving the produced images having defects is provided via the Internet. A particular user such as an owner or a manager of a particular structure such as a building, a monument in a park or the like can correct the images of the structure using a correction application via the Internet to obtain the more accurate images.

81 Claims, 19 Drawing Sheets

F I G. 1
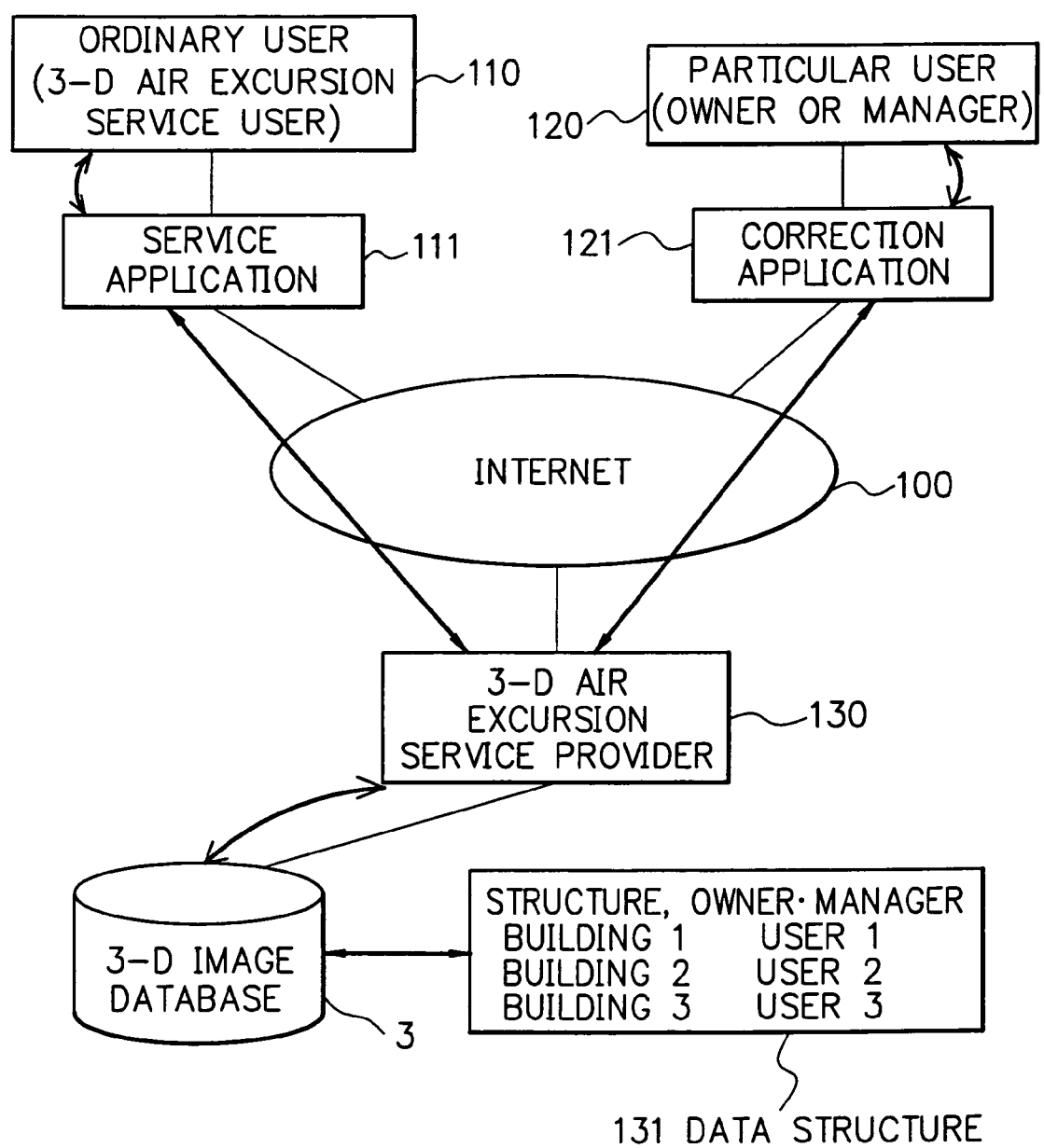

AIR EXCURSION EXAMPLE IN 3-D SHAPE OBJECT GATHERINGS
(ARROWS INDICATE AIR EXCURSION LOCUS)

FIG. 6

```
THE OPERATION IS INITIATED BY NEWLY INPUTTING 3-D
IMAGE DATA (3-D OBJECT ID SET) PRODUCED BY 3-D
IMAGE CONVERTER 2 IN 3-D IMAGE DATABASE 3.
```
↓
```
Do I = 1 to 3 3-D OBJECT ID NUMBER PRESENT IN
   3-D IMAGE DATA ARRAY VARIABLE X[I]. 3-D OBJECT
   ID = 3-D OBJECT I ARRAY VARIABLE X[I]. PHYSICAL
   POSITION = PHYSICAL POSITION OF OBJECT
Do end
```
↓
```
PICK UP ONE RECORD OF STRUCTURE DATABASE 4.
```
↓
```
WHILE (RECORD IS PRESENT)
 VARIABLE Y = RECORD —> PHYSICAL POSITION STORAGE
                        ITEM
 Do I = 1 to N
    IF  VARIABLE Y = X[I]. PHYSICAL POSITION
      THEN RECORD —> 3-D OBJECT ID STORAGE
                     ITEM = X[I]. 3-D OBJECT ID
  Do end
 PICK UP ONE RECORD OF STRUCTURE DATABASE 4
WHILE end
```

FIG. 8

RECEIVE PARTICULAR POSITION WHERE USER WANTS TO MAKE AIR EXCURSION AND VIEWPOINT POSITION FROM USER.

TRANSFER RECEIVED INFORMATION TO POSITION INPUT TYPE IMAGE OUTPUT UNIT 6, AND RECEIVE 3-D IMAGE DATA.

Label 1:
AWAIT USER INSTRUCTION
 IF RECEIVE PARTICULAR VIEWPOINT POSITION FROM USER,
      THEN EXHIBIT 3-D SOLID IMAGE SEEN FROM RECEIVED
      VIEWPOINT TO USER.
         GOTO Label 1
 IF RECEIVE REQUEST OF STRUCTURE CHANGE
      THEN RECEIVE PARTICULAR STRUCTURE ID AND
      OWNER NAME FROM USER.
         GOTO Label 1
 IF RECEIVE FINISH REQUEST, FINISH

FIG. 10

3-D IMAGE DATABASE 3

| IMAGE | POSITION | | 3-D IMAGE DATA | |
|---|---|---|---|---|
| | | | 3-D OBJECT ID SET α | 3-D OBJECT ID SET β |
| IMAGE ID1 | LATITUDE A1 | LONGITUDE B1 | | |
| IMAGE ID2 | LATITUDE A2 | LONGITUDE B2 | | |
| --- | --- | --- | --- | --- |

*When 3-D object data is updated, position and physical position are compared with each other to specify relevant record, and it is discriminated whether or not value is stored in 3-D object ID column of specified record.*

*When column is blank, judging from physical position, 3-D object ID is specified from 3-D image data and stores specified one.*

STRUCTURE DATABASE 4

| STRUCTURE ID | PHYSICAL POSITION | | OWNER NAME | 3-D OBJECT ID | CHANGE YES NO |
|---|---|---|---|---|---|
| STRUCTURE ID1 | LATITUDE X1 | LONGITUDE Y1 | USER1 | (OBJECT-1) | NO |
| STRUCTURE ID2 | LATITUDE X2 | LONGITUDE Y2 | USER2 | (OBJECT'-2) | YES |
| STRUCTURE ID3 | LATITUDE X3 | LONGITUDE Y3 | USER3 | (OBJECT-3) | NO |
| STRUCTURE ID4 | LATITUDE X4 | LONGITUDE Y4 | USER4 | (OBJECT-4) | NO |
| --- | --- | --- | --- | --- | --- |

CHANGE OBJECT DATABASE 11

| STRUCTURE ID | SHAPE INFORMATION | TEXTURE INFORMATION |
|---|---|---|
| STRUCTURE ID2 | HEIGHT H'2 TOP a'2×b'2 | TEXTURE DATA T2 |
| STRUCTURE ID6 | HEIGHT H'6 RADIUS r'6 | TEXTURE DATA T6 |
| --- | --- | --- |

(HAVING RELATIONSHIP)

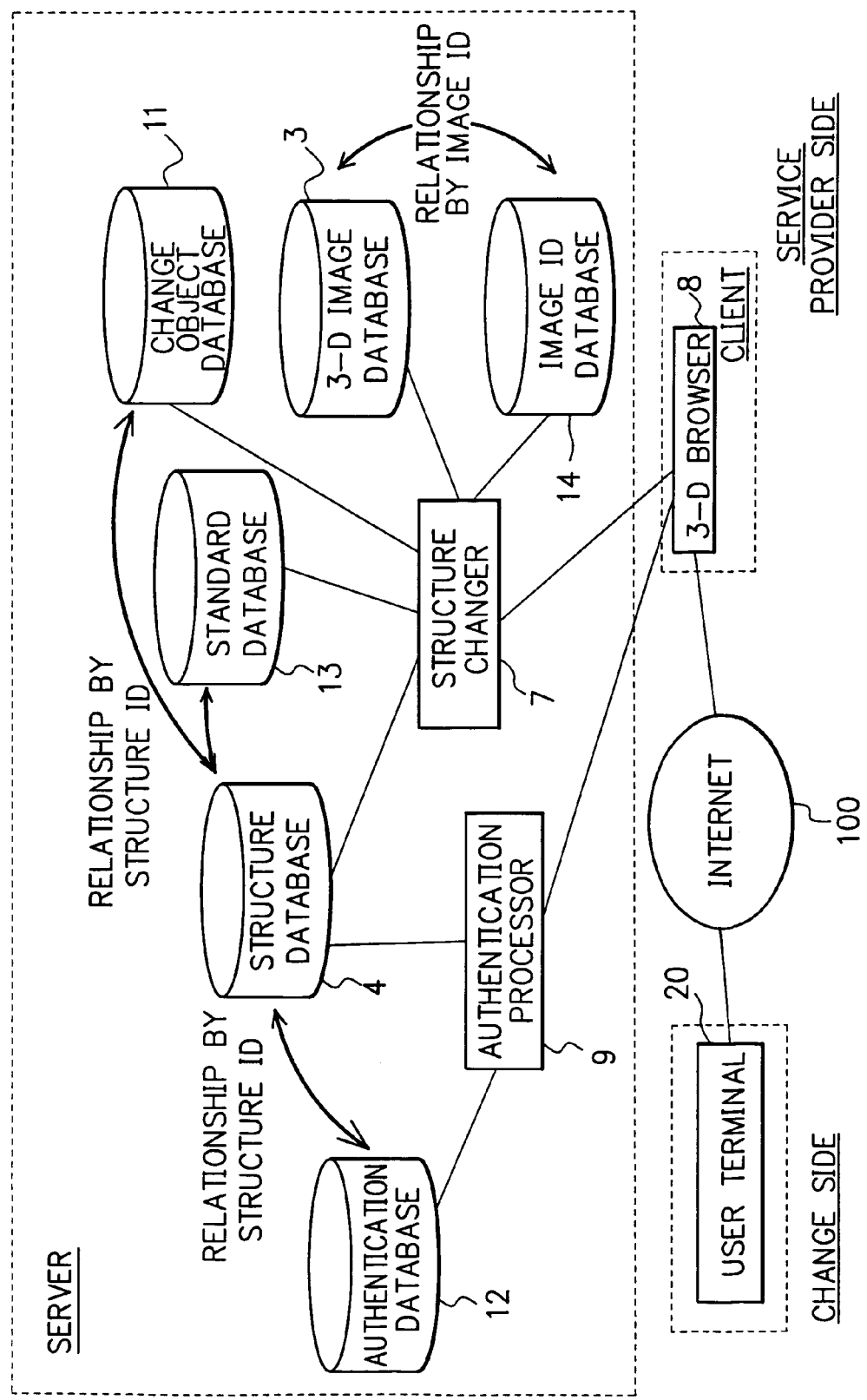

FIG. 12

AUTHENTICATION DATABASE 12

| STRUCTURE ID | PASSWORD | ADDRESS | E-MAIL ADDRESS |
|---|---|---|---|
| STRUCTURE ID1 | PASSWORD 1 | ADDRESS 1 | USER1@aaa.aaa |
| STRUCTURE ID2 | PASSWORD 2 | ADDRESS 2 | USER2@bbb.bbb |
| STRUCTURE ID3 | PASSWORD 3 | ADDRESS 3 | USER3@ccc.ccc |
| STRUCTURE ID4 | PASSWORD 4 | ADDRESS 4 | USER4@ddd.ddd |
| ---- | ---- | ---- | ---- |

(HAVING RELATIONSHIP)

| STRUCTURE ID | PHYSICAL POSITION | OWNER NAME | 3-D OBJECT ID | CHANGE YES NO |
|---|---|---|---|---|
| STRUCTURE ID1 | LATITUDE X1 LONGITUDE Y1 | USER 1 | (OBJECT-1) | NO |
| STRUCTURE ID2 | LATITUDE X2 LONGITUDE Y2 | USER 2 | (OBJECT-2) | YES |
| STRUCTURE ID3 | LATITUDE X3 LONGITUDE Y3 | USER 3 | (OBJECT-3) | NO |
| STRUCTURE ID4 | LATITUDE X4 LONGITUDE Y4 | USER 4 | (OBJECT-4) | NO |
| ---- | ---- | ---- | ---- | ---- |

STRUCTURE DATABASE 4

FIG. 14

STANDARD DATABASE 13

| STRUCTURE ID | GROUND AREA |
|---|---|
| STRUCTURE ID1 | AREA A1 |
| STRUCTURE ID2 | AREA A2 |
| STRUCTURE ID3 | AREA A2 |
| STRUCTURE ID4 | AREA A2 |
| ---- | ---- |

HAVING RELATIONSHIP

| STRUCTURE ID | PHYSICAL POSITION | OWNER NAME | 3-D OBJECT ID | CHANGE YES NO |
|---|---|---|---|---|
| STRUCTURE ID1 | LATITUDE X1 LONGITUDE Y1 | USER 1 | (OBJECT-1) | NO |
| STRUCTURE ID2 | LATITUDE X2 LONGITUDE Y2 | USER 2 | (OBJECT-2) | YES |
| STRUCTURE ID3 | LATITUDE X3 LONGITUDE Y3 | USER 3 | (OBJECT-3) | NO |
| STRUCTURE ID4 | LATITUDE X4 LONGITUDE Y4 | USER 4 | (OBJECT-4) | NO |
| ---- | ---- | ---- | ---- | ---- |

STRUCTURE DATABASE 4

F I G. 16

IMAGE ID DATABASE 14

| IMAGE ID | AERIAL PHOTOGRAPH ID |
|---|---|
| IMAGE ID1 | AREA A1 |
| IMAGE ID2 | AREA A2 |
| --- | --- |

HAVING RELATIONSHIP

| IMAGE | POSITION | 3-D IMAGE DATA |
|---|---|---|
| IMAGE ID1 | LATITUDE A1 LONGITUDE B1 | 3-D OBJECT ID SET α |
| IMAGE ID2 | LATITUDE A2 LONGITUDE B2 | 3-D OBJECT ID SET β |
| --- | --- | --- |

3-D IMAGE DATABASE 3

F I G. 19
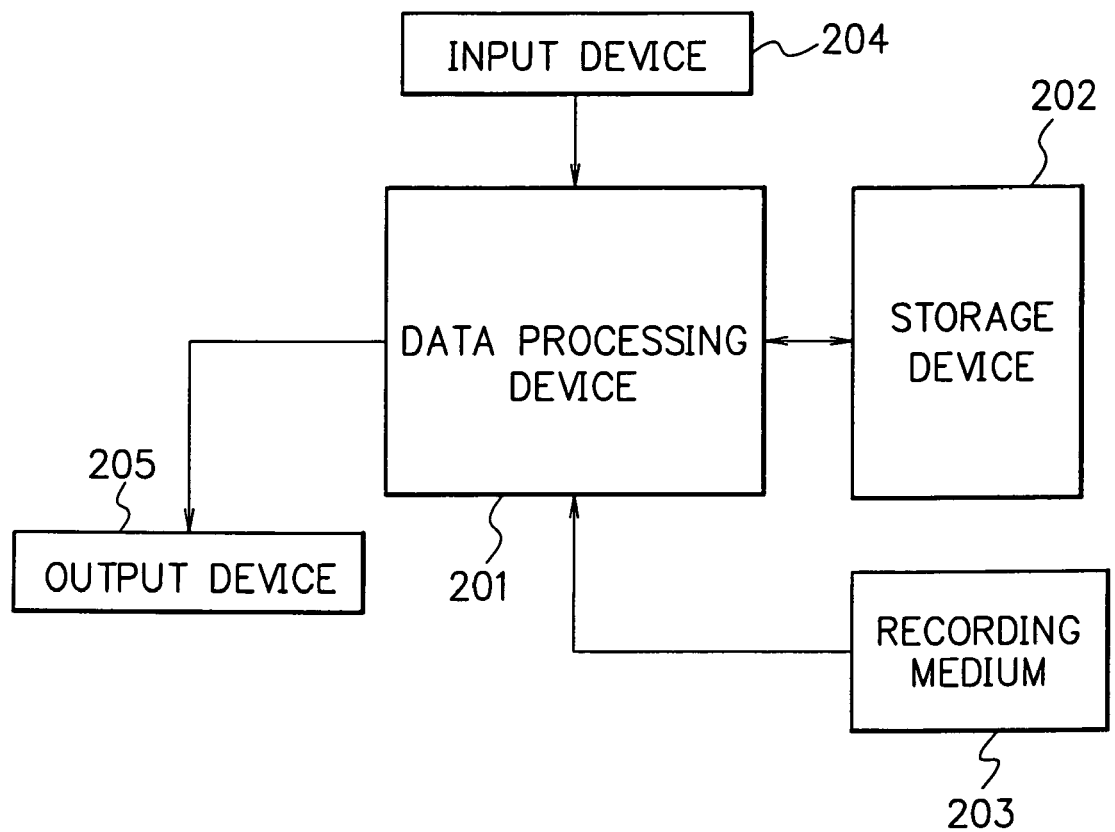

CLIENT AND PROGRAM FOR IMPROVING THREE-DIMENSIONAL AIR EXCURSION AND METHOD THEREOF

CROSS-REFERENCE TO RELATED PATENT APPLICATIONS

This application is a division of application Ser. No. 10/012,509, filed Dec. 12, 2001, now U.S. Pat. No. 7,218, 318, and related to a concurrently filed application entitled Method and Program for Improving Three-Dimensional Air Excursion Using a Server and a Client and based on Japanese Patent Application No. 2000-380924, filed Dec. 14, 2000, by Hideo Shimazu. This application claims only subject matter disclosed in the parent application and therefore presents no new matter.

BACKGROUND OF THE INVENTION

The present invention relates to a server, a client for improving a three-dimensional air excursion and a method and programs thereof, and more particularly to a server, a client for improving a three-dimensional air excursion and a method and programs thereof for providing a device for improving produced images having defects by using the Internet when automatically producing a three-dimensional solid map in a three-dimensional air excursion service provided on the Internet.

DESCRIPTION OF THE RELATED ART

In a conventional searching method of a home page on the World Wide Web or a page on the i-mode network, in general, a previously distributed menu of the Yahoo or the like is traced and a link is followed to find the target page. In another conventional searching method, a keyword is given to a search engine of the Alta Vista or the like to obtain hit pages in a search.

One feature of these searching methods permits the searching of the pages entirely independent of their physical positions. For example, when information concerning flower shops is searched, hit pages of the flower shops in Tokyo, Paris, Sapporo and so on are obtained regardless of their actual locations.

This feature is useful when a user does not intend to designate a place. However, there is a case where the user wants to find proper flower shops. For example, even when the user want to obtain only the pages of the flower shops near a certain place, the conventional searching method picks up the pages of the flower shops in Paris, Sapporo and so on.

For solving this inconvenience, there is a service in which two-dimensional map information is given to the user, and when the user points to one place on the map, a link to shop information in that area is automatically followed to provide the shop information.

In such service, for example, a map of a country is shown and pointing one prefecture in the country on the map enables a user to access a Web site showing the information of the prefecture. For instance, a French map is shown in the home page of the French governmental travel bureau (http://www.franceinformation.or.jp/oindex/index.html), and clicking a mouse on one prefecture on the French map calls up related information of that prefecture.

This is the service that can be realized on the Web by using a clickable map technique and is used very often. In the following, Japanese Patent No. 2,756,483 entitled "Advertisement information providing method and its registering method" (prior art 1), in which information of link targets is limited to advertisement information, and only two-dimensional maps are used, will be explained as an example of the service.

In prior art 1, advertisement information is linked to its related position in previously stored map information, and when the user designates one position on the map, the advertisement information at the designated position is provided.

In such method as represented by prior art 1, that the two-dimensional map information is provided and the user inputs the positional information on the map, following problems arise.

First, update of map information requires very much time, labor and cost. In particular, rebuilding of structures and construction of new roads are frequently carried out in cities, and in order to reflect these changes to the map rapidly, the maintenance and the update of the map requires enormous works.

Second, the information search from the map is short of entertainingness. The search on the map is just like an operation for finding some station along a railroad line. To enhance users' enjoyment, it is thinkable that the maps provided to the users are made to be more entertaining, for example, by employing three-dimensional solid maps.

As a producing method of the three-dimensional solid map, a method of producing the map from plural pictures has been developed. As to the pictures to be used, for example, an aerial photograph taken from the sky and a satellite image taken from an artificial satellite are desirable.

However, the three-dimensional image data production using the aerial picture and the satellite image involves a fatal problem. That is, all existent objects on the ground surface cannot be always taken in the aerial photograph.

For instance, when a rectangular solid building is taken from two different points, apart from its top surface, each picture surely records different two of four sides and if there are overlapping parts in the remaining two sides, a three-dimensional image of the rectangular solid building can be produced by the plural pictures taken from the different points. However, it is likely that the plural pictures show the three sides of the building but none of them shows the remaining one side, since generally the buildings are not regularly arranged in the same direction but face to various directions on the ground surface. As a result, no information about color, shape and texture of the remaining one side can be obtained. With the lack of such information, the three-dimensional image of the building cannot be produced.

Hence, to produce a three-dimensional image in such a case, a program for assigning the default color, shape and texture appropriately to the unseen one side is required in order to complement the lack of the information. For example, regarding the color and the texture, the same as or the average value of the other three sides can be used, and concerning the shape, it is supposed that the unseen one side is a usual flat surface. However, the produced building image may not have the true form. Only the unseen one side may have a special shape or a different color. Thus, when the owner or the manager of the building sees the produced image, it is highly likely that he wants to revise the image.

In the case that a three-dimensional image is automatically produced by using aerial photographs or satellite images of a certain area, with consideration in principle, a three-dimensional image of the whole Tokyo, the whole Japan or the whole world can be produced and service utilizing the three-dimensional image can be provided. In the service, there are theoretically only problems of a machine power and a cost of picture photographing except for a problem of a scale. However, it is impossible for a service provider using the three-dimensional image to check whether or not the shapes of buildings are correct one by one.

SUMMARY OF THE INVENTION

It is therefore an object of the present invention to provide a server, a client for improving a three-dimensional air excursion and a method and programs thereof for providing a device for improving produced images having defects by using the Internet when automatically producing a three-dimensional solid map in a three-dimensional air excursion service provided on the Internet in view of the aforementioned problems of the prior art.

That is, as shown in FIG. 1, the present invention provides a function which permits an ordinary user to carry out an excursion flight in a three-dimensional space, and in addition, a function which allows a user having a special right such as an owner or a manager of a three-dimensional shape object such as a building and a monument in a park present in a three-dimensional space to change its image through the Internet.

In accordance with one aspect of the present invention, there is provided a server for improving a three-dimensional air excursion, comprising: a three-dimensional image database for storing a three-dimensional image data including a three-dimensional object identification for uniquely identifying a three-dimensional object data produced by a stereographic processing of photograph data with a correspondence of the three-dimensional image data and a ground surface position; a structure database for storing a structure identification for uniquely identifying a structure, a physical position of the structure on a ground surface and a three-dimensional object identification corresponding to the structure, in corresponding state; and a structure identification finding means for calculating the physical position of the structure corresponding to the three-dimensional object identification included in the three-dimensional image data from the ground surface position corresponding to the three-dimensional image data, specifying the structure identification in the structure database on the basis of the calculated physical position of the structure and the physical position of the structure in the structure database, and storing the three-dimensional object identification corresponding to the structure with a correspondence of the specified structure identification and the three-dimensional object identification in the structure database.

In the present invention, the server may further comprise a position input type three-dimensional image output means for reading the three-dimensional image data out of the three-dimensional image database on the basis of its input position to output the readout three-dimensional image data.

The server of the present invention may further comprise a structure changing means for producing a three-dimensional object data of the structure after changing the structure on the basis of a change content of the structure for updating the structure included in a three-dimensional solid map.

In accordance with another aspect of the present invention, there is provided a server for improving a three-dimensional air excursion, comprising: a three-dimensional image database for storing a three-dimensional image data including a set of three-dimensional object identifications for uniquely identifying three-dimensional object data produced by a stereographic processing of photograph data with a correspondence of the three-dimensional image data and a ground surface position; a structure database for storing a structure identification for uniquely identifying a structure and a three-dimensional object identification corresponding to the structure; and a structure changing means for producing a three-dimensional object data of the structure after changing the structure on the basis of a change content of the structure for updating the structure included in a three-dimensional solid map.

In a server of the present invention, the structure database may include a change yes no column for showing whether or not the three-dimensional object data is produced after the change, and the structure changing means indicates a change yes in the change yes no column of the structure database when producing the three-dimensional object data after the change. The server may further comprise an object database for storing the three-dimensional object data and the three-dimensional object identifications; a change object database for storing the three-dimensional object data produced by the structure changing means after the change and the structure identifications; and a position input type three-dimensional image output means for reading the three-dimensional image data out of the three-dimensional image database on the basis of the input position, looking up the change yes no column of the structure database by using the three-dimensional object identification included in the readout three-dimensional image data, extracting the three-dimensional object data after the change from the change object database by using the coincident structure identification when the change yes is indicated in the change yes no column of the structure database, and extracting the three-dimensional object data from the object database by using the three-dimensional object identification when a change no is indicated in the change yes no column.

In a server of the present invention, the structure database stores a physical position of the structure on the ground surface, and the three-dimensional image database stores the three-dimensional image data including a set of three-dimensional object identifications for uniquely identifying the three-dimensional object data produced by the stereographic processing of the photograph data with a correspondence of the three-dimensional image data and the ground surface position. The server may further comprise a structure identification finding means for calculating the physical position of the structure corresponding to the three-dimensional object identification included in the three-dimensional image data from the ground surface position corresponding to the three-dimensional image data, specifying the structure identification in the structure database on the basis of the calculated physical position of the structure and the physical position of the structure in the structure database, and storing the three-dimensional object identification corresponding to the structure with a correspondence of the specified structure identification and the three-dimensional object identification in the structure database.

In the server of the present invention, the change content of the structure may include image data showing at least one side to be changed for an objective structure, a photographed position and a camera position, and the structure changing means may specify the photograph data including the structure on the basis of the input structure identification and newly produces the three-dimensional object data after the change on the basis of the specified photograph data and the input image data.

In the server of the present invention, the change content of the structure may include image data showing all sides for an objective structure, a photographed position and a camera position, and the structure changing means may newly produce the three-dimensional object data after the change on the basis of the input image data.

In the server of the present invention, the structure changing means may read the three-dimensional object data of the structure to be changed out of the object database on the basis of the input structure identification to present the readout three-dimensional object data to a user and produces the three-dimensional object data after the change on the basis of the input change content of the structure.

In the server of the present invention, the three-dimensional object data and the three-dimensional object data after the change include shape information representing a size and a shape of the structure and texture information representing a texture mapped to each side of the structure, and the change content of the structure is about the shape information and the texture information.

The server of the present invention may further comprise a standard database for storing a ground area standard of the structure on the three-dimensional solid map, correspondingly to the structure identification, wherein the structure changing means discriminates whether or not the three-dimensional object data produced after the change meets the ground area standard and stores the three-dimensional object data after the change in the change object database when the three-dimensional object data after the change meets the ground area standard.

In the server of the present invention, the ground area standard is the ground surface area on the three-dimensional solid map storing the structure, and the structure changing means may determine whether or not the three-dimensional object data after the change meets the ground area standard by discriminating whether or not the three-dimensional object data after the change is within a certain area of the ground surface area.

In the server of the present invention, the ground area standard is the ground surface area on the three-dimensional solid map storing the structure, and the structure changing means may determine whether or not the three-dimensional object data after the change meets the ground area standard by discriminating whether or not the three-dimensional object data after the change is within a certain area of a solid area produced by moving the ground surface area in a direction perpendicular to the ground.

In the server of the present invention, the structure database may store an owner name of the structure corresponding to the structure identification, corresponding to the structure identification. The server may further comprise an authentication processing means for requiring the owner name of the structure to be changed and the structure identification from the user when the change content of the structure is sent from the user, and executing a user authentication by using the received structure identification and the owner name of the structure.

The server of the present invention may further comprise an authentication database for storing a password registered by the user, corresponding to each structure identification; and an authentication processing means for requiring at least the structure identification and the password from the user when the change content of the structure is sent from the user, specifying the corresponding password in the authentication database by using the received structure identification and executing a user authentication by using the specified password.

The server of the present invention may further comprise a three-dimensional image converting means for executing the stereographic processing of the photograph data and producing the three-dimensional image data including the three-dimensional object identification for uniquely identifying the produced three-dimensional object data.

In the server of the present invention, the photograph data is either an aerial photograph or a satellite image taken from an upper air.

In accordance with another aspect of the present invention, there is provided a client for improving a three-dimensional air excursion, comprising: a position information output means for outputting position information to a server for improving a three-dimensional air excursion, which stores three-dimensional image data including a three-dimensional object identification for uniquely identifying three-dimensional object data produced by a stereographic processing of photograph data with a correspondence of the three-dimensional image data and a ground surface position in a three-dimensional image database, stores a structure identification for uniquely identifying a structure, a physical position of the structure on a ground surface and a three-dimensional object identification corresponding to the structure, in corresponding state, in a structure database, calculates the physical position of the structure corresponding to the three-dimensional object identification included in the three-dimensional image data from the ground surface position corresponding to the three-dimensional image data, specifies the structure identification in the structure database on the basis of the calculated physical position of the structure and the physical position of the structure in the structure database, and stores the three-dimensional object identification corresponding to the structure with a correspondence of the specified structure identification and the three-dimensional object identification in the structure database; and a three-dimensional browser for having the server output the three-dimensional image data read out of the three-dimensional image database on the basis of the position information and producing a three-dimensional image solid expression from viewpoint position information on the basis of the output three-dimensional image data.

In accordance with another aspect of the present invention, there is provided a client for improving a three-dimensional air excursion, comprising: a change content output means for outputting a change content received from a user for updating a structure included in a three-dimensional solid map to a server for improving a three-dimensional air excursion, which executes a stereographic processing of a plurality of photograph data including photographs of the same area shot from different angle points, ground surface positions of photographed areas and camera positions to produce three-dimensional object data, stores three-dimensional image data including a three-dimensional object identification for uniquely identifying the produced three-dimensional object data with a correspondence of the three-dimensional image data and the ground surface position in a three-dimensional image database, and stores a structure identification for uniquely identifying a structure and the three-dimensional object identification corresponding to the structure in a structure database; and a device to make the server produce three-dimensional object data of the structure after its change on the basis of the change content of the structure.

In accordance with another aspect of the present invention, there is provided a client for improving a three-dimensional air excursion, comprising: a change content output means for outputting a structure identification for updating a structure included in a three-dimensional solid map to a server for improving a three-dimensional air excursion, which executes a stereographic processing of a plurality of photograph data including photographs of the same area shot from different angle points, ground surface positions of photographed areas and camera positions to produce three-dimensional object data, stores three-dimensional image data including a three-dimensional object identification for uniquely identifying the produced three-dimensional object data with a correspondence of the three-dimensional image data and the ground surface position in a three-dimensional image database, and stores a structure identification for uniquely identifying a structure and the three-dimensional object identification corresponding to the structure in a structure database, having the server read the three-dimensional object data of the structure to be updated out of an object database on the basis of the input structure identification and output the readout three-dimensional object data to the client, presenting the input three-dimensional object data, and outputting a change content of the structure to the server; and a device to make the server produce three-dimensional object data of the structure after its change on the basis of the change content of the structure.

In the client of the present invention, the structure database may include a change yes no column for showing whether or not the three-dimensional object data after the change is produced by the server. The client may further comprise a position information output means for outputting position information input by a user to the server which indicates a change yes in the change yes no column of the structure database when producing the three-dimensional object data after the change, stores the three-dimensional object data and the three-dimensional object identification in the object database, and stores the three-dimensional object data after the change and the structure identification in a change object database; and a three-dimensional browser for having the server read the three-dimensional image data out of the three-dimensional image database on the basis of the input position information, look up the change yes no column of the structure database by using the three-dimensional object identification included in the readout three-dimensional image data, extract the three-dimensional object data after the change from the change object database by using the coincident structure identification when the change yes is shown in the change yes no column, extract the three-dimensional object data from the object database by using the three-dimensional object identification when the change no is shown in the change yes no column and output the extracted three-dimensional object data included in the three-dimensional image data, and thereby producing a three-dimensional image solid expression from the viewpoint position information input by the user on the basis of the received three-dimensional image data.

In accordance with another aspect of the present invention, there is provided a method for improving a three-dimensional air excursion using a server for improving a three-dimensional air excursion and a client for improving a three-dimensional air excursion, comprising the steps of: storing three-dimensional image data including a three-dimensional object identification for uniquely identifying three-dimensional object data produced by a stereographic processing of photograph data with a correspondence of the three-dimensional image data and a ground surface position in a three-dimensional image database in the server; storing a structure identification for uniquely identifying a structure, a physical position of the structure on a ground surface and a three-dimensional object identification corresponding to the structure, in corresponding state, in a structure database in the server; calculating the physical position of the structure corresponding to the three-dimensional object identification included in the three-dimensional image data, specifying the structure identification in the structure database on the basis of the calculated physical position and the physical position of the structure in the structure database, and storing the three-dimensional object identification corresponding to the structure, correspondingly to the specified structure identification in the structure database in the server by a structure identification finding means; outputting position information to the server by a position information output means in the client; reading the three-dimensional image data out of the three-dimensional image database on the basis of the position information sent from the client and outputting the readout three-dimensional image data by a position input type three-dimensional image output means in the server; and producing a three-dimensional image solid expression from input viewpoint position information on the basis of the three-dimensional image data sent from the position input type three-dimensional image output means by the client.

In accordance with another aspect of the present invention, there is provided a method for improving a three-dimensional air excursion using a server for improving a three-dimensional air excursion and a client for improving a three-dimensional air excursion, comprising the steps of: outputting a change content sent from a user for updating a structure included in a three-dimensional solid map to the server by a change content output means in the client; and producing three-dimensional object data of the structure after the change on the basis of the change content of the structure sent from the client by a structure changing means in the server.

In accordance with another aspect of the present invention, there is provided a method for improving a three-dimensional air excursion using a server for improving a three-dimensional air excursion and a client for improving a three-dimensional air excursion, comprising the steps of: executing a stereographic processing of a plurality of photograph data including photographs of the same area shot from different angle points, ground surface positions of photographed areas and camera positions to produce three-dimensional object data, and storing three-dimensional image data including a three-dimensional object identification for uniquely identifying the produced three-dimensional object data with; storing a structure identification for uniquely identifying a structure and the three-dimensional object identification corresponding to the structure in a structure database in the server; outputting a change content received from a user for updating the structure included in a three-dimensional solid map to the server by a change content output means in the client; and producing the three-dimensional object data of the structure after the change on the basis of the input change content of the structure by a structure changing means in the server.

In accordance with another aspect of the present invention, there is provided a method for improving a three-dimensional air excursion using a server for improving a three-dimensional air excursion and a client for improving a three-dimensional air excursion, comprising the steps of: executing a stereographic processing of a plurality of photograph data including photographs of the same area shot from different angle points, ground surface positions of photographed areas and camera positions to produce three-dimensional object data, and storing three-dimensional image data including a three-dimensional object identification for uniquely identifying the produced three-dimensional object data with a correspondence of the three-dimensional image data and the ground surface position in a three-dimensional image database in the server; storing a structure identification for uniquely identifying a structure and the three-dimensional object identification corresponding to the structure in a structure database in the server; outputting a structure identification for updating a structure included in a three-dimensional solid map to the server by a change content output means in the client; reading the three-dimensional object data of the structure to be updated out of an object database on the basis of the input structure identification to output the readout three-dimensional object data to the client by a structure changing means in the server; presenting the input three-dimensional object and outputting a change content of the structure to the server by the change content output means in the client; and producing the three-dimensional object data of the structure after the change on the basis of the input change content of the structure by the structure changing means in the server.

In accordance with another aspect of the present invention, there is provided a method for improving a three-dimensional air excursion using a server for improving a three-dimensional air excursion and a client for improving a three-dimensional air excursion, comprising the steps of: executing a stereographic processing of a plurality of photograph data including photographs of the same area shot from different angle points, ground surface positions of photographed areas and camera positions to produce three-dimensional object data, and storing three-dimensional image data including a three-dimensional object identification for uniquely identifying the produced three-dimensional object data with a correspondence of the three-dimensional image data and the ground surface position in a three-dimensional image database in the server; storing a structure identification for uniquely identifying a structure, the three-dimensional object identification corresponding to the structure and an owner name of the structure in a structure database in the server; outputting a change content of the structure, sent from a user, for updating the structure included in a three-dimensional solid map, the structure identification of the structure and the owner name of the structure to the server by a change content output means in the client; executing a user authentication by using the input structure identification and the owner name of the structure by an authentication processing means in the server; and producing the three-dimensional object data of the structure after the change on the basis of the input change content of the structure by a structure changing means in the server.

In accordance with another aspect of the present invention, there is provided a method for improving a three-dimensional air excursion using a server for improving a three-dimensional air excursion and a client for improving a three-dimensional air excursion, comprising the steps of: executing a stereographic processing of a plurality of photograph data including photographs of the same area shot from different angle points, ground surface positions of photographed areas and camera positions to produce three-dimensional object data, and storing three-dimensional image data including a three-dimensional object identification for uniquely identifying the produced three-dimensional object data; storing a structure identification for uniquely identifying a structure and the three-dimensional object identification corresponding to the structure in a structure database in the server; storing a password registered by a user corresponding to each structure identification in an authentication database in the server; outputting a change content of the structure, sent from the user, for updating the structure included in a three-dimensional solid map, at least the structure identification and the password to the server by a change content output means in the client; specifying the corresponding password in the authentication database by using the input structure identification and executing a user authentication by using the specified password by an authentication processing means in the server; and producing the three-dimensional object data of the structure after the change on the basis of the input change content of the structure by a structure changing means in the server.

In the method of the present invention, the structure database may include a change yes no column for showing whether or not the three-dimensional object data after the change is produced by the structure changing means, and the structure changing means indicates a change yes in the change yes no column of the structure database when producing the three-dimensional object data after the change. The method may further comprise the steps of: storing the three-dimensional object data and the three-dimensional object identification in an object database in the server; storing the three-dimensional object data after the change and the structure identification in a change object database in the server; outputting the position information input by the user to the server by a position output means in the client; reading the three-dimensional image data out of the three-dimensional image database on the basis of the input position information, looking up the change yes no column of the structure database by using the three-dimensional object identification included in the readout three-dimensional image data, extracting the three-dimensional object data after the change from the change object database by using the coincident structure identification when the change yes is shown in the change yes no column, extracting the three-dimensional object data from the object database by using the three-dimensional object identification when the change no is shown in the change yes no column, and outputting the extracted three-dimensional object data included in the three-dimensional image data by a position input type three-dimensional image output means in the server; and producing a three-dimensional image solid expression from the viewpoint position information input by the user on the basis of the three-dimensional image data sent from the position input type three-dimensional image output means by a three-dimensional browser in the client.

The method of the present invention may further comprise the steps of: storing the physical position of the structure on the ground surface in the structure database; and calculating the physical position of the structure corresponding to the three-dimensional object identification included in the three-dimensional image data on the basis of the ground surface position corresponding to the three-dimensional image data, specifying the structure identification of the structure database on the basis of the calculated physical position and the physical position of the structure in the structure database, and storing the three-dimensional object identification corresponding to the structure, correspondingly to the specified structure identification in the server by a structure identification finding means.

In the method of the present invention, the change content of the structure may include image data showing at least one side to be changed, a ground surface position of a photographed area and a camera position. The method may further comprise the steps of: outputting the structure identification of the structure to be updated to the server by the change content output means in the client; and specifying the photograph data including the structure on the basis of the structure identification input by the client and newly producing the three-dimensional object data after the change on the basis of the specified photograph data and the input image data by the structure changing means in the server.

In the method of the present invention, the change content of the structure to be changed may include image data showing all sides, a ground surface position of a photographed area and a camera position. The method may further comprise the step of newly producing the three-dimensional object data after the change on the basis of the input image data by the structure changing means.

In the method of the present invention, the three-dimensional object data and the three-dimensional object data after the change may include shape information representing a size and a shape of the structure and texture information representing a texture mapped to each side of the structure, and the change content of the structure includes the shape information and the texture information.

In the present invention, the method may further comprise the steps of: storing a ground area standard of the structure on the three-dimensional solid map, corresponding to the three-dimensional object identification in a standard database, discriminating whether or not the three-dimensional object data produced after the change meets the ground area standard; and storing the three-dimensional object data after the change in the change object database when the three-dimensional object data after the change meets the ground area standard by the structure changing means.

In the method of the present invention, the ground area standard is the ground surface area of the three-dimensional solid map storing the structure. The method may further comprise the step of determining whether or not the three-dimensional object data after the change meets the ground area standard by discriminating whether or not the three-dimensional object data after the change is within a certain area of the ground surface area by the structure changing means.

In the method of the present invention, the ground area standard is the ground surface area of the three-dimensional solid map storing the structure. The method may further comprise the step of determining whether or not the three-dimensional object data after the change meets the ground area standard by discriminating whether or not the three-dimensional object data after the change is within a certain area of a solid area produced by moving the ground surface area in a direction perpendicular to the ground by the structure changing means.

In the present invention, the method may further comprise the step of executing the stereographic processing of the photograph data, and producing the three-dimensional image data including the three-dimensional object identification for uniquely identifying the produced three-dimensional object data by a three-dimensional image converting means in the server.

In the method of the present invention, the photograph data is either an aerial photograph or a satellite image taken from an upper air.

In accordance with another aspect of the present invention, there is provided a computer program for a server for improving a three-dimensional air excursion to execute processes of: storing three-dimensional image data including a three-dimensional object identification for uniquely identifying a three-dimensional object data produced by a stereographic processing of photograph data with a correspondence of the three-dimensional image data and a ground surface position in a three-dimensional image database; storing a structure identification for uniquely identifying a structure, a physical position of the structure on a ground surface and a three-dimensional object identification corresponding to the structure, in corresponding state, in a structure database; and calculating the physical position of the structure corresponding to the three-dimensional object identification included in the three-dimensional image data from the ground surface position corresponding to the three-dimensional image data, specifying the structure identification in the structure database on the basis of the calculated physical position of the structure and the physical position of the structure in the structure database, and storing the three-dimensional object identification corresponding to the structure with a correspondence of the specified structure identification and the three-dimensional object identification in the structure database by a structure identification finding means.

In accordance with another aspect of the present invention, there is provided a computer program for a server for improving a three-dimensional air excursion to execute processes of: storing a three-dimensional image data including a set of three-dimensional object identifications for uniquely identifying three-dimensional object data produced by a stereographic processing of photograph data with a correspondence of the three-dimensional image data and a ground surface position in a three-dimensional image database; storing a structure identification for uniquely identifying a structure and a three-dimensional object identification corresponding to the structure in a structure database; and producing a three-dimensional object data of the structure after changing the structure on the basis of a change content of the structure for updating the structure included in a three-dimensional solid map by a structure changing means.

The recording medium of the present invention may store a computer program for a server for improving a three-dimensional air excursion to execute processes of: preparing a change yes no column for showing whether or not the three-dimensional object data is produced after the change in the structure database, indicating change yes in the change yes no column of the structure database when producing the three-dimensional object data after the change by the structure changing means; storing the three-dimensional object data and the three-dimensional object identifications in an object database; storing the three-dimensional object data produced by the structure changing means after the change and the structure identifications in a change object database; and reading the three-dimensional image data out of the three-dimensional image database on the basis of the input position, looking up the change yes no column in the structure database by using the three-dimensional object identification included in the readout three-dimensional image data, extracting the three-dimensional object data after the change from the change object database by using the coincident structure identification when the change yes is indicated in the change yes no column of the structure database, and extracting the three-dimensional object data from the object database by using the three-dimensional object identification when a change no is indicated in the change yes no column by a position input type three-dimensional image output means.

In accordance with another aspect of the present invention, there is provided a computer program for a client for improving a three-dimensional air excursion to execute processes of: outputting position information to a server storing three-dimensional image data including a three-dimensional object identification for uniquely identifying three-dimensional object data produced by a stereographic processing of photograph data with a correspondence of the three-dimensional image data and a ground surface position in a three-dimensional image database, storing a structure identification for uniquely identifying a structure, a physical position of the structure on a ground surface and a three-dimensional object identification corresponding to the structure, in corresponding state, in a structure database, calculating the physical position of the structure corresponding to the three-dimensional object identification included in the three-dimensional image data from the ground surface position corresponding to the three-dimensional image data, specifying the structure identification in the structure database on the basis of the calculated physical position of the structure and the physical position of the structure in the structure database, and storing the three-dimensional object identification corresponding to the structure with a correspondence of the specified structure identification and the three-dimensional object identification in the structure database, by a position information output means; and having the server output the three-dimensional image data read out of the three-dimensional image database on the basis of the position information, and producing a three-dimensional image solid expression from viewpoint position information on the basis of the output three-dimensional image data by a three-dimensional browser.

In accordance with another aspect of the present invention, there is provided a computer program for a client for improving a three-dimensional air excursion to execute processes of: outputting position information input by a user to a server preparing a change yes no column for showing whether or not the three-dimensional object data after the change is produced by the server in the structure database; storing a change yes in the change yes no column of the structure database when producing the three-dimensional object data after the change, storing the three-dimensional object data and the three-dimensional object identification in the object database, and storing the three-dimensional object data after the change and the structure identification in a change object database, by a position information output means; and having the server read the three-dimensional image data out of the three-dimensional image database on the basis of the input position information, extract the three-dimensional object data from the object database by using the three-dimensional object identification included in the readout three-dimensional image data, and output the extracted three-dimensional object data included in the three-dimensional image data, and producing a three-dimensional image solid expression from the viewpoint position information input by the user on the basis of the received three-dimensional image data by a three-dimensional browser.

BRIEF DESCRIPTION OF THE DRAWINGS

The objects, features and advantages of the present invention will become more apparent from the consideration of the following detailed description, taken in conjunction with the accompanying drawings, in which:

FIG. 1 is a schematic block diagram of a system for realizing a three-dimensional air excursion service for an ordinary user and a structure image correction service for a particular user on a three-dimensional solid map according to the present invention;

FIG. 6 is a flowchart for showing an operation of a structure ID finder shown in FIG. 5;

FIG. 8 is a flowchart for showing an operation of a three-dimensional browser shown in FIG. 5;

FIG. 10 is a graph showing relationship among a three-dimensional image database, a structure database and an change object database, partly shown in FIG. 5;

FIG. 11 is a schematic block diagram of a system for updating a structure with a user authentication device according to the first embodiment of the present invention;

FIG. 12 is a graph showing relationship between a structure database and an authentication database shown in FIG. 11;

FIG. 14 is a graph showing relationship between a structure database and a standard database shown in FIG. 11;

FIG. 16 is a graph showing relationship between a three-dimensional image database and an image ID database shown in FIG. 11;

FIG. 19 is a block diagram of a system for realizing a server and a client according to the first embodiment of the present invention.

DESCRIPTION OF THE PREFERRED EMBODIMENTS

Figure 2:
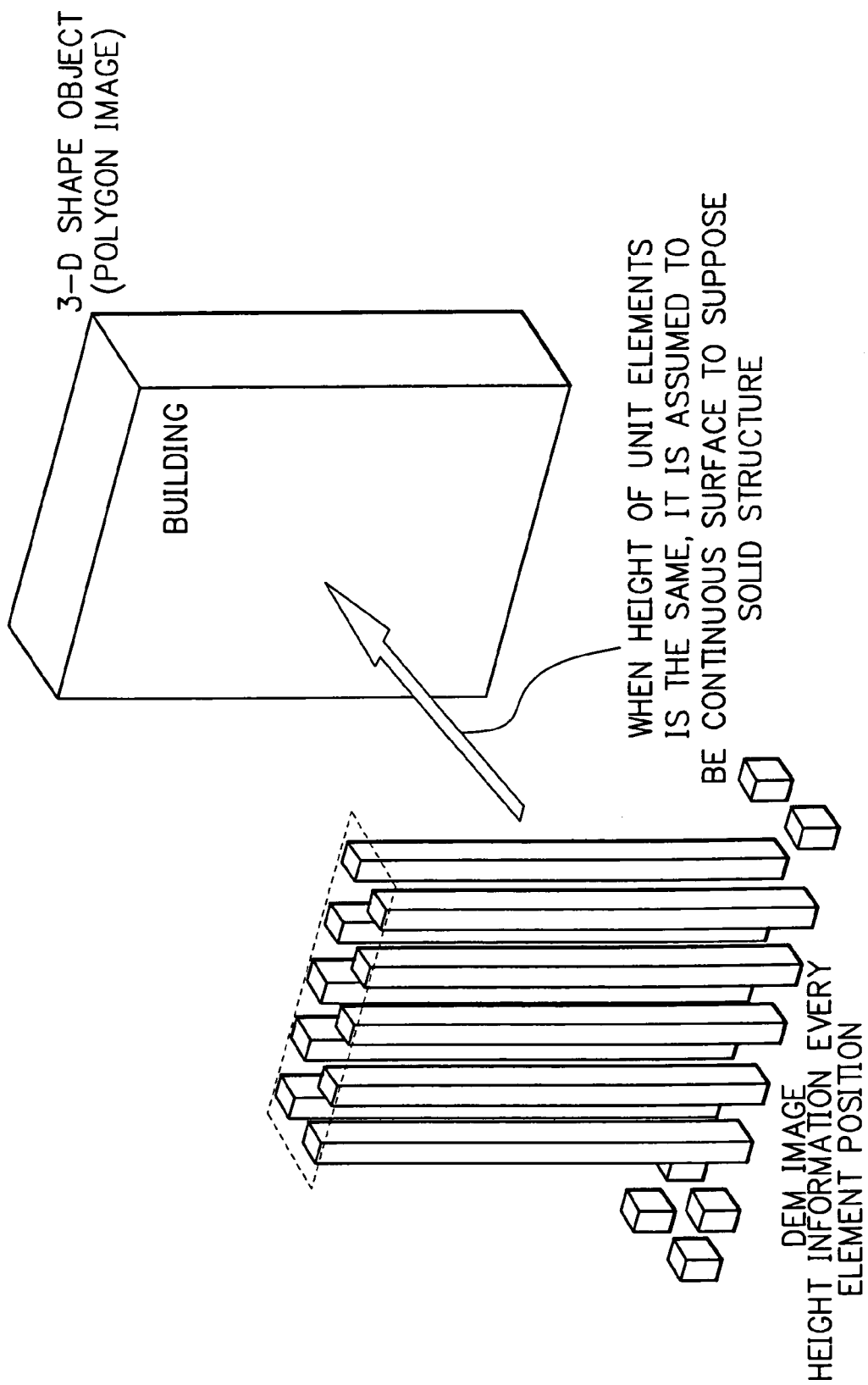
FIG. 2 is a schematic perspective view for explaining an operation of a polygonization of a structure in the system shown in FIG. 1.

The preferred embodiments of the present invention will be described more specifically in connection with the attached figures.

The present invention provides a three-dimensional solid map for a lot of users via the Internet. For example, the present invention provides a configuration for faithfully reproducing actual scenery as a three-dimensional solid map by a three-dimensional air excursion machine and method for providing an air excursion function on the three-dimensional solid map.

In the description of the present invention, as a three-dimensional solid map producing method, a method for producing a three-dimensional solid map using plural aerial pictures or satellite images is used. Besides, using the three-dimensional solid map produced in this manner, an air excursion function on a three-dimensional solid map is provided to users via the Internet.

There is shown in FIG. 1 a system for realizing a three-dimensional air excursion service for an ordinary user and a structure image correction service for a particular user such as an owner or a manager of a building in order to correct or revise the structure image of the building on a three-dimensional solid map according to the present invention.

As shown in FIG. 1, in the system of the present invention, there are an ordinary user 21 and a particular user 120 such as an owner or a manager of a particular building or the like. The present invention provides an air excursion service on the three-dimensional solid map for the ordinary user 21 and a structure image correction service of the particular building on the three-dimensional solid map for the particular user 120. In FIG. 1, a provider side of these services is a three-dimensional air excursion service provider 130. The three-dimensional air excursion service provider 130 has a three-dimensional image database 3 which stores a combination of structure identifying information (attribute: structure and definition area: building 1, building 2, building 3, . . . ) and an owner or a manager of each building (attribute: owner or manager and definition area: user 1, user 2, user 3, . . . ) as its data structure 131.

Further, the ordinary user 21 connects the three-dimensional air excursion service provider 130 via the Internet 100 by using a service application 111 in order to receive the three-dimensional air excursion service from the three-dimensional air excursion service provider 130, and the particular user 120 connects the three-dimensional air excursion service provider 130 via the Internet 100 by using a correction application 121 to receive the structure image correction service from the three-dimensional air excursion service provider 130.

Consequently, the ordinary user 21 enjoys the three-dimensional air excursion service by the service application 111, and the particular user 120 receives the service to correct the structure image of the particular building that the particular user 120 owns or manages on the three-dimensional solid map by the correction application 121.

[Production of Three-Dimensional Solid Map]

First, as the three-dimensional solid map producing method, a method for producing a three-dimensional solid map by carrying out a stereographic processing of two pictures obtained by photographing the ground is used. However, according to the present invention, any method having the capability of producing the three-dimensional solid map applicable to the present invention can be used. As to the plural pictures, an aerial photograph taken from the sky and a satellite image taken from an artificial satellite are used.

Regarding the aerial photograph and the satellite image to be used in the present invention, for example, a commercially available satellite image taken from the artificial satellite IKONOS operated by Space Imaging Corporation in the U.S. is employed. Further, this artificial satellite IKONOS periodically moves round all over the earth, and the satellite image of the whole ground of the earth can be bought periodically (e.g. approximately every one week). In order to make clear the photographed ground surface area, the information on the accurate latitude and longitude, and further photographed time are attached to the aerial photographs and the satellite images. Hence, a purchaser can exactly know photographed area, shooting time and angle of every photograph. This is because the artificial satellite moves in the predetermined orbit at the predetermined time. In this manner, the aerial photograph or the satellite image indicates the angle to the ground surface, the distance from the ground surface and the photographed area clearly, and thus can be suitably used for producing the three-dimensional solid map.

Further, plural aerial photographs or satellite images obtained by taking the same area from different angle points are stereographically processed, and from the discrepancy between the objects taken in the plural aerial photographs or the satellite images, heights of structures, mountains and the like are calculated. However, in a conventional stereographic processing, it is impossible to draw information to identify the mountains and the structures. This is because the stereographic processing includes only the process for calculating a height of each unit point. In the three-dimensional solid map producing method of the present invention, an image area according to certain rule is dealt as one object.

In the stereographic processing of the plural aerial photographs or satellite images obtained by taking the same area from the different angle points, for example, when the aerial photographs are taken from an airplane flying at a low altitude, it is possible to calculate a height of an object per approximately 25 cm×25 cm square unit on the ground surface. On the other hand, in the stereographic processing of the plural satellite images taken from an artificial satellite, the height calculation per approximately 1 m×1 m square unit on the ground surface is the processing limit at present. This is a sufficient resolution for producing the three-dimensional solid map according to the present invention. However, when the aerial photographs or satellite images having higher resolution are available, the more detailed image can be realized. The satellite images are hereinafter referred to as "aerial photographs" as well for brevity in the following description of the present invention.

Further, the processing for calculating the heights of the mountains, the buildings and the like on the ground surface from the plural aerial photographs is called digital elevation modeling (DEM). Processes in the DEM will be described in detail with reference to FIG. 2.

When the DEM is conducted by using plural aerial photographs, produced image information indicates a height per each unit area (resolution), that is, 1 m×1 m square unit in this description. This image information is visually explained in FIG. 2. In FIG. 2, the produced three-dimensional image is shown like a row of poles. In other words, each unit is one strap having a predetermined height. This image information is called a DEM image.

Taking the case that the height information is calculated every 1 m×1 m square unit as an example, for instance, as to a building having 20 m×20 m length and width square and 30 m high, the height of the 20 m×20 m area where the building is located is calculated as 30 m, and the height of its surrounding area (the height of the ground surface) is calculated as, for example, 0 m.

Now, applying a rule that the same height points which continuously exist are regarded as one structure, when there are points of 30 m high in 20 m×20 m area, a 20 m×20 m building having a height of 30 m is assumed to exist. In this processing, those continuous points having the same height are handled as a structure. In this way, the continuous same height data is assumed as the structure, and this is called a polygonization in the description. As described above, the polygon data determined as the building (structure) is stored in a database correspondingly to the information of the shape, the color and the texture of this building (shape information and texture information) and the information of the location of the polygon (the latitude and longitude on the earth).

The aforementioned process is a series of flows of the three-dimensional image production by the stereographic processing.

According to the present invention, the stereographic processing technique, the DEM technique and the polygonization technique are not restricted to the specific methods, and if technique can produce necessary data for the present invention, any technique is applicable as far as it is not departing from the spirit and the scope of the present invention.

Further, when the stereographic processing is performed, a structure or a mountain is extracted as polygon data of a polygon. In the present invention, the extracted structure or mountain is called a landmark. Furthermore, the polygon data of the extracted landmark is called three-dimensional object data. The three-dimensional object data of the present invention includes the shape information of each landmark (for example, the length information of each side of the top and the four sides when a landmark is a building of a quadrilateral pole) and the texture information of each surface (the image information including the color information and the texture information).

However, as described above, a precise position information on the basis of certain point is given to the plural aerial photographs to be subjected to the stereographic processing, and it is possible to permit the extracted three-dimensional object data to correspond not only to the shape information and the texture information but also to the precise position information. The position information is defined by the distances from the reference point to an x-axis and a y-axis on the three-dimensional solid map.

Figure 3:
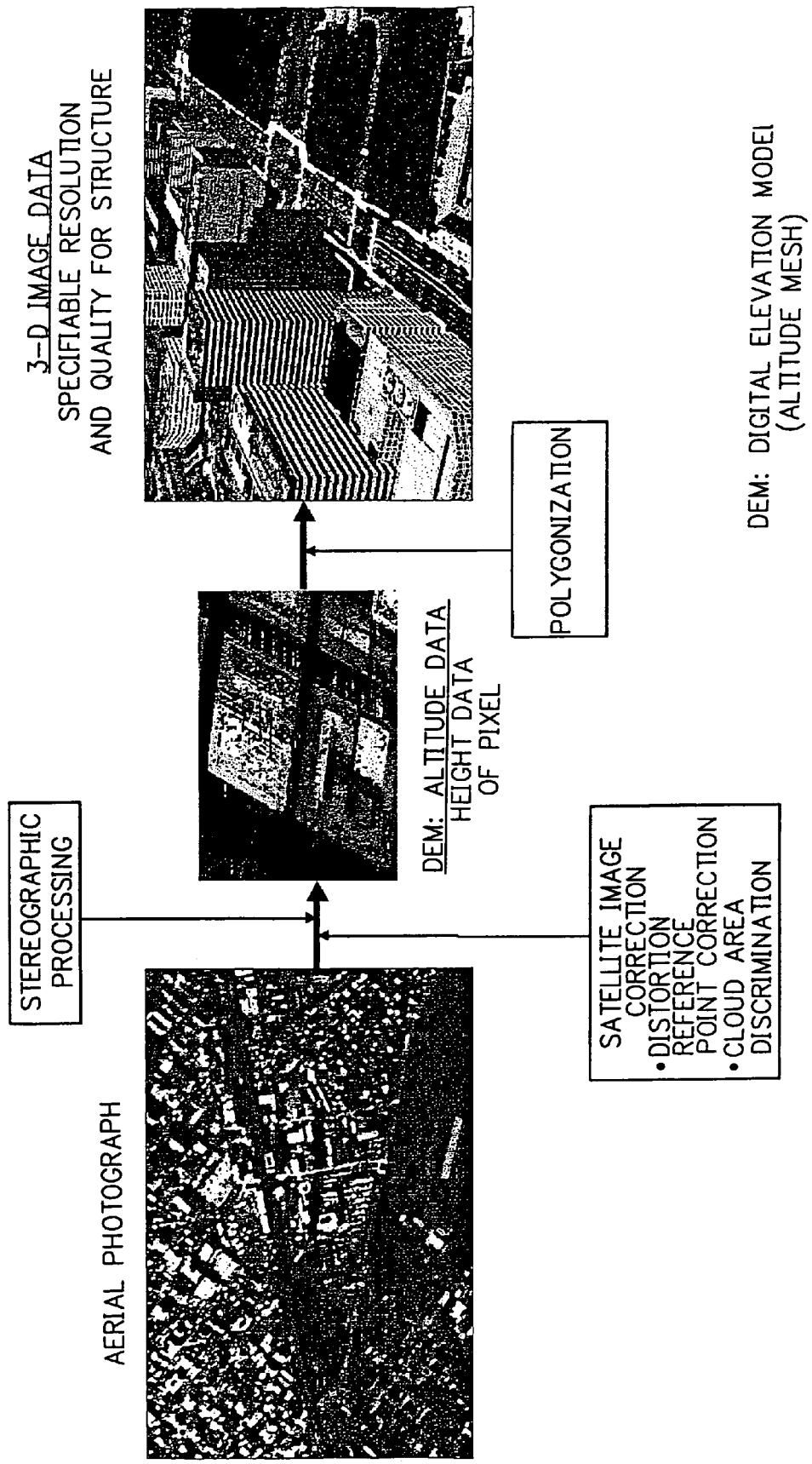
FIG. 3 is a schematic view showing a flow of a three-dimensional image data producing performed in the system shown in FIG. 1.

There is shown in FIG. 3 a schematic flow of a process for producing the three-dimensional solid map from the plural aerial photographs. In FIG. 3, first a satellite image correction is performed for the plural aerial photographs. This satellite image correction includes processes for correcting the distortion caused by taking the aerial photograph using a super-telephoto lens from the artificial satellite, correcting the shift of the reference point itself (distortion-reference point correction), and for interpreting a ground image damaged by the clouds owing to photographing from high above the sky (cloud area interpretation). After the satellite image correction of the plural aerial photographs is conducted, the stereographic processing is carried out by using the effective images to obtain the DEM image. Eventually, the polygonization of the DEM image is performed to produce the three-dimensional object data.

When the three-dimensional solid map is formed on the basis of the three-dimensional object data produced in this way to be provided to the users, a viewpoint position is given on the three-dimensional solid map. The three-dimensional solid expression is projected to a two-dimensional plane on the basis of the given viewpoint position to produce a two-dimensional image of the three-dimensional solid expression. Concerning a producing method of this two-dimensional image, a conventional rendering method or the like has been known, and thus the detailed description thereof is omitted. However, this method can be modified into various forms without departing from the spirit and scope of the present invention.

Further, by changing the viewpoint position given in the above-described processing, a three-dimensional solid map seen from a different direction can be reproduced. For a user viewing the three-dimensional solid map from his viewpoint position, by successively moving the viewpoint position, the two-dimensional image just as he conducting an excursion flight in the air can be obtained as shown in FIG. 4.

Figure 4:
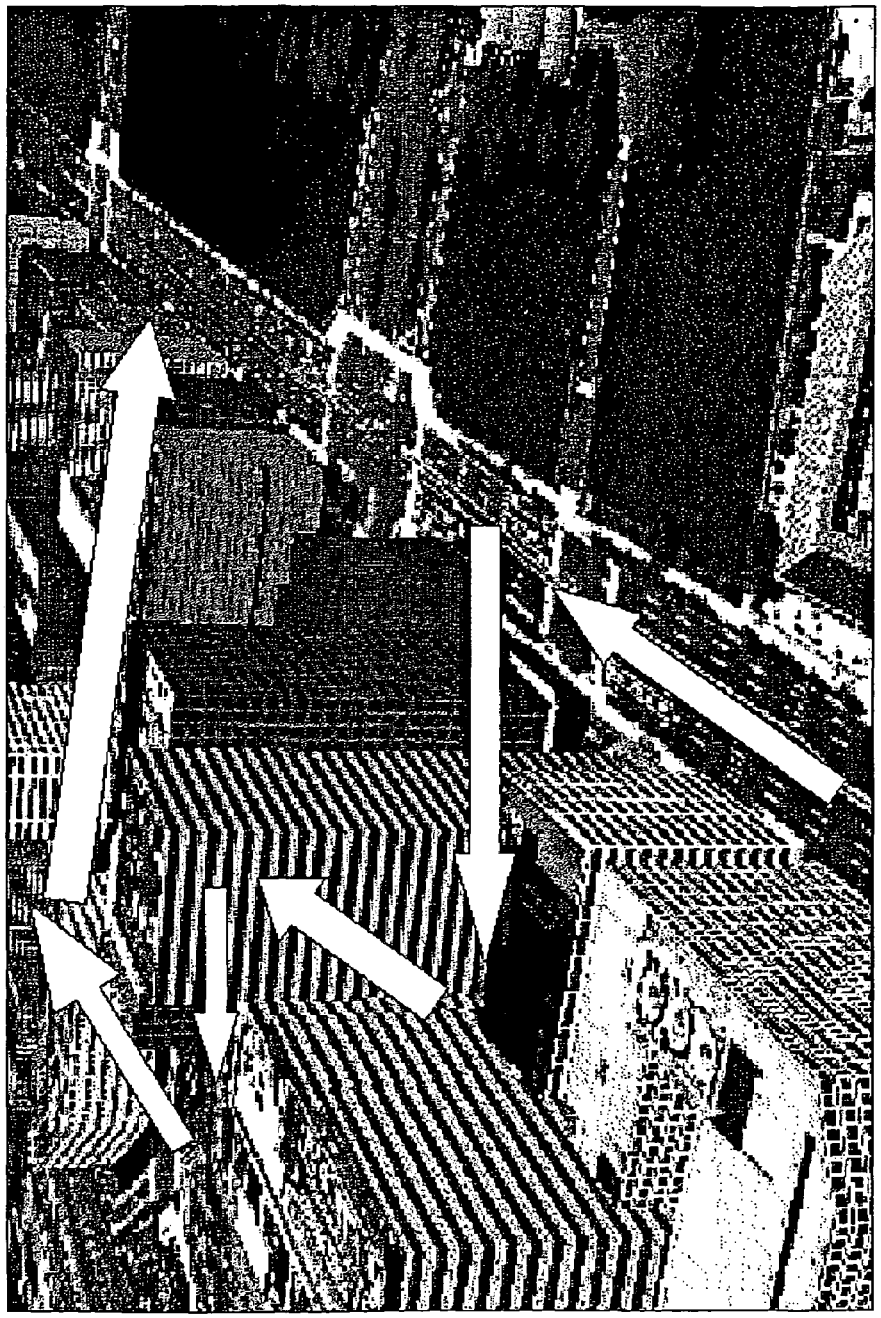
FIG. 4 is a schematic view for showing a three-dimensional air excursion service provided by the system shown in FIG. 1.

Incidentally, in FIG. 4, the arrows indicate the moving direction of the user. The viewpoint position of the user moves in agreement with this moving direction, and the two-dimensional image of the three-dimensional solid expression is produced.

However, in the above producing of the three-dimensional object data on the basis of the aerial photographs, all existent objects on the ground surface cannot be always taken in the aerial photograph shot from the sky.

For example, when one rectangular solid landmark is taken from two different points in the sky, there is the case where the three sides of the landmark are recorded but the remaining one side cannot be taken in none of the plural photographs. Such case can be readily caused since the landmarks are not regularly arranged in the same direction but in the various directions on the ground surface.

Hence, even in such case, a program for producing the three-dimensional object data according to the present invention can complement the lacking side and produce the three-dimensional object data of the objective landmark by appropriately applying the default shape, color and texture to the lacking side. For example, when complementing the color and the texture to the lacking side, the same as or the average value of the other three sides, the images of which are completely taken, can be used. When complementing the shape of the lacking side, the lacking side is supposed to have a usual rectangular flat surface and the complement is carried out.

However, the completed three-dimensional object data obtained by such a processing does not always present the true form and the true texture. The lacking side can have a special shape or a different color. In such case, it is thinkable that the owner or the manager of the landmark wants a correction of the landmark.

In addition, when the two-dimensional image data of the three-dimensional solid expression is automatically produced by using the aerial photographs or the satellite images, if taking no account of the problem of its scale, it is possible in principle to produce the three-dimensional object data of the whole Tokyo, the whole Japan or the whole world, and provide the service using the three-dimensional object data. However, a manual operation is required for confirming whether or not the shape of each landmark is correct one by one, and a service provider cannot conduct this operation in practice.

Hence, the present invention provides a server, a client for improving a three-dimensional air excursion and a method and programs thereof, which is capable of entrusting an owner or a manager of a structure such as a building with revising work of the structure to reduce work of a service provider and realizing a three-dimensional solid map that the owner or the manager is satisfied.

A three-dimensional air excursion machine of the present invention including functions for producing a three-dimensional solid map from plural aerial photographs and for permitting a particular user such as an owner or a manager of a landmark on the three-dimensional solid map to update the image of the landmark through the Internet will be described in detail with reference to the figures.

First Embodiment

First, a three-dimensional air excursion machine according to a first embodiment of the present invention will be described in detail with reference to FIG. 5.

Figure 5:
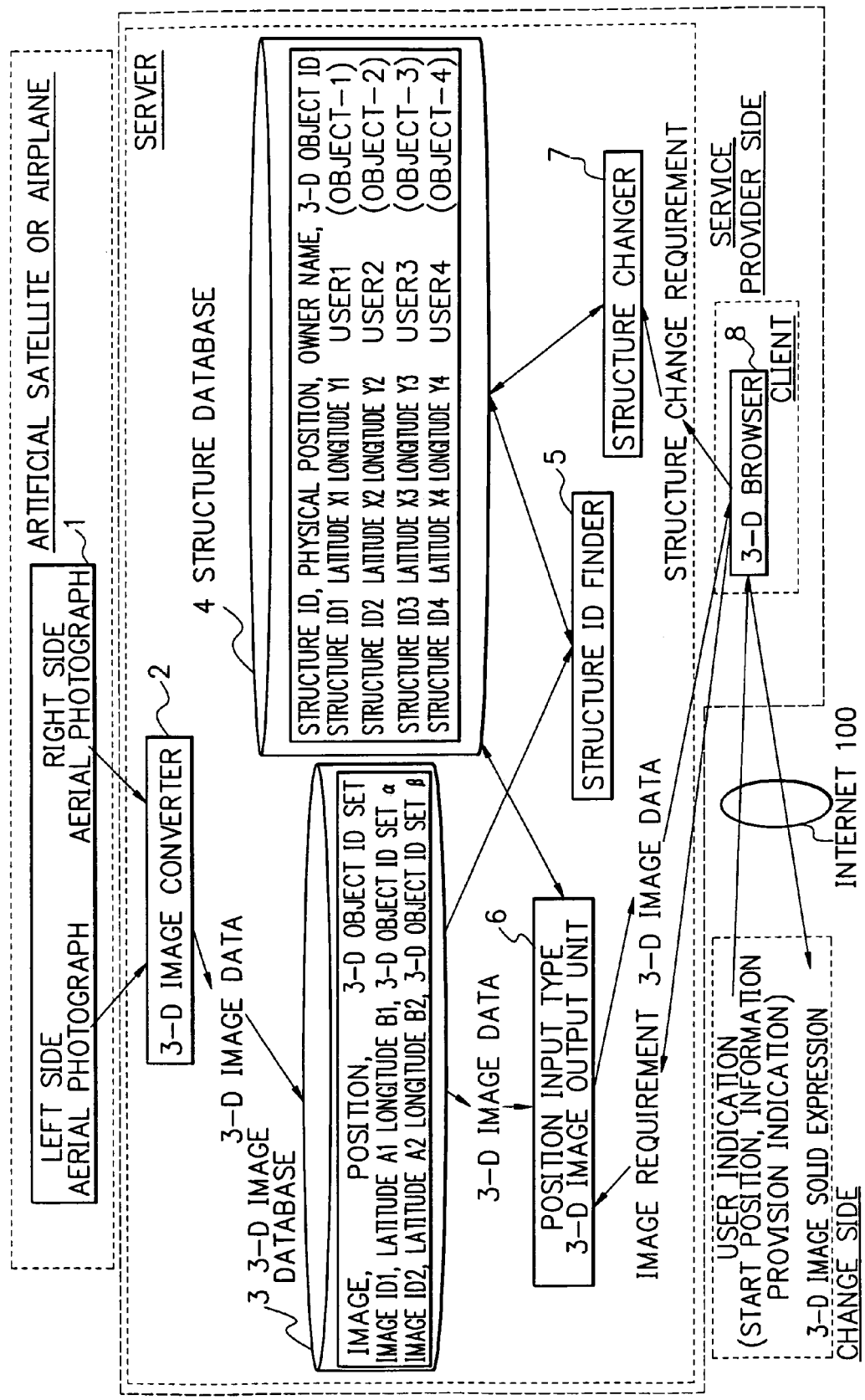
FIG. 5 is a block diagram of a system for providing a three-dimensional air excursion service for an ordinary user and a structure image correction service for a particular user on a three-dimensional solid map according to a first embodiment of the present invention.

In FIG. 5, a three-dimensional air excursion machine for providing an air excursion in a three-dimensional image for a lot of users via the Internet according to the present invention comprises a server and a client on the side of the three-dimensional air excursion service provider 130. The server includes a three-dimensional image converter 2, a three-dimensional image database 3, a structure database 4, a structure ID finder 5, a position input type three-dimensional image output unit 6, a structure changer 7. The client includes a three-dimensional browser 8. In this embodiment, the system shown in FIG. 5 is a client-server type distributed processing system. However, the present invention is not restricted to this system and various modifications can be made without departing from the spirit and the scope of the present invention There is shown in FIG. 19 a construction for realizing each of the server and the client described above.

[Construction of Server]

As shown in FIG. 19, in this embodiment, the server comprises a data processing device 201 composed of a CPU or the like, a storage device 202 to be used for storing readout programs and data and performing work, a recording medium 203 such as a hard disk having a relatively large recording capacity, an input device 204 for controlling data input from external devices via lines and an output device 205 for controlling data output to the external devices via the lines. In this construction, for example, concerning the server shown in FIG. 5, the three-dimensional image converter 2, the structure ID finder 5, the position input type three-dimensional image output unit 6 and the structure changer 7 are executed and operated by the data processing device 201, and the programs for executing and operating these members are stored in the recording medium 203. Hence, when each of the three-dimensional image converter 2, the structure ID finder 5, the position input type three-dimensional image output unit 6 and the structure changer 7 is executed or operated, each of the programs is read out of the recording medium 203 and is executed. The storage device 202 further functions as an operation area of the data processing device 201 and temporarily stores the readout programs and the result of the processing in operation. The input device 204 and the output device 205 each control the communication with the external device such as the client, and control to input a request via or from the client and to output the specified data or the processing result. In this embodiment, the three-dimensional image database 3 and the structure database 4 can be adapted to be stored in the recording medium 203 or in another external recording medium (including a file server) (not shown) via the input device 204.

[Construction of Client]

The construction shown in FIG. 19 can be used as the client. That is, the client shown in FIG. 5 comprises a data processing device 201, a storage device 202, a recording medium 203, an input device 204 and an output device 205 in the same manner as the server described above. In this construction, the program for executing and operating the three-dimensional browser 8 is stored in the recording medium 203. Hence, when the three-dimensional browser 8 is executed or operated, the program is read out of the recording medium 203 by the data processing device 201 and the work area is reserved in the storage device 202. The input device 204 and the output device 205 control the communication with the Internet or the server connected to the client.

[Three-Dimensional Image Converter 2]

In FIG. 5, when plural aerial photographs 1 which are obtained by taking the same area from different angle points and are specified by a physical position such as latitude and longitude are input, the three-dimensional image converter 2 carries out a stereographic processing of the plural aerial photographs 1 to produce a three-dimensional object ID (identification) set type of three-dimensional image data having shape information and texture information representing information of a shape, a color and a texture of an object and a physical position indicating an correct position of the object. The three-dimensional object ID includes the identification information for uniquely identifying a corresponding object, and corresponds to the information of the physical position of the object, such as the latitude and the longitude (which can be expressed by the distances from a reference point or origin to an x-axis and a y-axis in the three-dimensional image data), and to the shape information and the texture information concerning the shape, the color and the texture of the object.

Regarding a method for discriminating the landmark in the data produced from the plural aerial photographs 1 in the above-described processing, when the DEM processing of the plural aerial photographs 1 is performed, the ground surface (an altitude 0 m) is discriminated and a landmark having a larger height than a predetermined threshold height from the ground surface and having a larger width over its top than a predetermined threshold width is determined to a structure. This embodiment is not restricted to this method, any method capable of recognizing a structure as an object can be applicable without departing from the spirit and the scope of the present invention.

The shape information such as the size and shape of the top and sides of the object discriminated as described above and the texture information such as the color and the texture of the object corresponds to the three-dimensional object ID and is stored and held in a database. This database is an object database 10 shown in FIG. 9. The object database 10 can be stored in the recording medium 203 shown in FIG. 19 or in an external recording medium (not shown) via the input device 204. The object database 10 can be configured as a relational database or a normal file type database.

Further, the three-dimensional image converter 2 shown in FIG. 5 produces a database, for example, an image ID database 14 shown in FIG. 16, for ensuring the relationship between the aerial photographs and the image IDs, as required in the following processing. The image ID database 14 includes image IDs assigned to respective three-dimensional image data produced by the three-dimensional image converter 2 and aerial photograph IDs for identifying the plural aerial photographs 1 as the base for producing the three-dimensional image data as attributes. The image ID database 14 and the three-dimensional image database 3 are related with each other by the image IDs as a main key, and the aerial photographs 1 will be read out at need when the three-dimensional object data is changed as hereinafter described. In the following, these processes will be described.

[Three-Dimensional Image Database 3]

When the three-dimensional image data is produced by the three-dimensional image converter 2, the three-dimensional image data, the image ID for uniquely identifying the three-dimensional image data and the position such as the latitude and the longitude of the reference position of the three-dimensional image data are stored in the three-dimensional image database 3 as a unit record. The three-dimensional image database 3, like the aforementioned object database 10, can be configured as a relational database or a normal file type database. As regards the designation of this position, when the three-dimensional image data to be produced has a fixed size (in all length, width and shape), it is enough to specify only the latitude and the longitude of the reference point. However, when the size is different in each three-dimensional image data, the data about the shape is stored in the same record. For instance, when it is only determined that each three-dimensional image data represents a rectangular area and lengths of sides of each rectangle are not determined, the position designation is effected by specifying the two diagonal points of the rectangle.

[Structure Database 4]

Further, for each of the three-dimensional image data stored in the three-dimensional image database 3, the information of the object corresponding to the three-dimensional object ID included in the three-dimensional image data is stored in the structure database 4. In the structure database 4, each of the three-dimensional object IDs included in the three-dimensional image data, the physical position (which is indicated as the position from the reference point in the three-dimensional image data or the latitude and the longitude on the actual ground surface) of the object, the structure ID for uniquely identifying the object (structures) and the owner or the manager name of the object are stored as one unit record.

In this case, the structure IDs, the physical positions and the owner or the manager names are previously stored in the structure database 4. Incidentally, in this embodiment, the structure IDs are previously opened to the public (but some structure IDs are opened to only the owners or the managers of the objective structures), and are actually indicated by numbers which are assigned when structures are constructed or a map is produced. Concerning the three-dimensional object ID in the structure database 4, when the three-dimensional image data is stored in the three-dimensional image database 3, the physical position of an object in the three-dimensional image data is compared with the physical positions previously stored in the structure database 4, and the three-dimensional object ID of the three-dimensional image data is stored in the column of the three-dimensional object ID of the record, the physical positions of which are coincident.

The structure database 4 can be constructed so that one three-dimensional image data may be dealt with by one database or all the three-dimensional image data may be dealt with altogether by one database. The structure database 4 can be configured as a relational database or a normal file type database in the same manner as the three-dimensional image database 3 and the object database 10.

All the three-dimensional image database 3, the structure database 4 and the object database 10 are produced or updated after the plural aerial photographs 1 are processed by the three-dimensional image converter 2 to produce their three-dimensional image data.

[Structure ID Finder 5]

The structure ID finder 5 carries out the storing of the three-dimensional object IDs to the structure database 4. When new three-dimensional image data is produced by the three-dimensional image converter 2 and the produced three-dimensional image data is stored in the three-dimensional image database 3, the structure ID finder 5 looks up the records in the structure database 4 one by one, for example, like a round robin, and updates the three-dimensional object IDs in the corresponding physical positions of the records in the structure database 4. This update operation is performed by storing the three-dimensional object IDs contained in the newly produced three-dimensional image data for all the records storing the physical positions contained in the areas of the newly produced three-dimensional image data in the structure database 4. At this time, an object database 10 is newly produced on the basis of the newly input plural aerial photographs.

Hence, the operation of the structure ID finder 5 makes the newly produced three-dimensional image database 3 and the newly produced object database 10 correspond to the structure database 4. In this operation, the structure IDs corresponding to all the three-dimensional object IDs included in the produced three-dimensional image data are all stored in the structure database 4. This prevents the contradiction that there is no structure ID corresponding to the three-dimensional object ID included in the produced three-dimensional image data. Incidentally, the three-dimensional object ID corresponding to the structure ID stored in the objective record cannot be present in the newly produced three-dimensional image data. In this case, the contradiction can be overcome as follows. For example, a three-dimensional object ID corresponding to an image showing a flat is made to correspond to the column of the three-dimensional object ID of the record storing this structure ID. Alternatively, nothing is made to correspond and the basic image (the original image before the three-dimensional objects are arranged) is used as it is. When the three-dimensional object ID corresponding to the image showing the flat is made correspond, the correspondence between the image showing the flat and the three-dimensional object ID can be realized in a new database (not shown). However, the aforementioned construction does not directly participate in the essence of the present invention. Thus, the present invention is not restricted to this and various modifications can be made without departing from the spirit and scope of the present invention.

[Operation Flow of Structure ID Finder 5]

An operation flow of the structure ID finder 5 will be described in connection with FIG. 6. In FIG. 6, an operation is initiated by adding new three-dimensional image data (a set of three-dimensional object IDs) produced by the three-dimensional image converter 2 to the three-dimensional image database 3.

The structure ID finder 5 then determines variables of the three-dimensional object IDs included in the three-dimensional image data and the physical positions of the objects corresponding to the three-dimensional object IDs (array variable X[I].three-dimensional object ID and array variable X[I].physical position, wherein I is a number (from 1) of three-dimensional object IDs included in the three-dimensional image data) by calculations in order to carry out the following processing of all the three-dimensional object IDs included in the three-dimensional image data. The array variable X[I].three-dimensional object ID is an array of all the three-dimensional object IDs included in the three-dimensional image data, and the array variable X[I].physical number is an array of the physical positions of the objects corresponding to all the three-dimensional object IDs included in the three-dimensional image data. Incidentally, when [I] is the same, the array variables are for the same object.

After the determination of the array variables, as described above, the structure ID finder 5 reads records one by one out of the structure database 4 in arbitrary order. In this case, the records are read out of the structure database 4 in a round robin fashion so as to avoid duplication of the readout records in the following processing.

When one record (the first record in the case of the readout in the round robin fashion) is read out in this manner, the structure ID finder 5 defines the physical position included in the readout record as a variable Y (variable Y=record−>physical position storage items), and then specifies variable X[I].physical position to obtain the variable Y equal (showing the same physical position) to the array variable X[I].physical position determined as described above. The structure ID finder 5 then updates the three-dimensional object ID storage items in the readout record by variable X[I].three-dimensional object ID corresponding to the specified variable X[I].physical position (I=the same value). Thereby, the three-dimensional object data corresponding to the structure ID in the structure database 4 becomes the newly produced shape information and texture information. However, when the variable X[I].physical position for obtaining the array variable X[I].physical position equal to the variable Y does not exist, the three-dimensional object ID corresponding to the flat image in the unknown database is stored in the column for storing the three-dimensional object ID in the readout record or, for example, the three-dimensional object ID storing column is left blank to use the original image in reproducing the three-dimensional solid map.

This processing is repeated until it is executed for all the records for storing the physical positions included in the newly produced three-dimensional image data in the structure database 4. In this embodiment, the three-dimensional object data produced from the plural aerial photographs cannot be used concerning the object, the three-dimensional object data of which is changed by the user in the processing for producing the three-dimensional solid map, and the updating of the three-dimensional object ID corresponding to the three-dimensional object data changed by the user in this processing step can be prevented. However, in this embodiment, there is no need for positively preventing the update and this description can be omitted.

[Position Input Type 3-D Image Output Unit 6]

When the position of a three-dimensional image is designated from the outside, for example, from a user terminal connected via the Internet, the position input type three-dimensional image output unit 6 searches the positions of the three-dimensional image data in the three-dimensional image database 3, and compares the position with the positions of the three-dimensional image data to specify the record of the three-dimensional image data including the designated specific position. The position input type three-dimensional image output unit 6 then reads out the three-dimensional image data part in the specified record to output the readout image data to the three-dimensional browser 8.

[Structure Changer 7]

Figure 9:
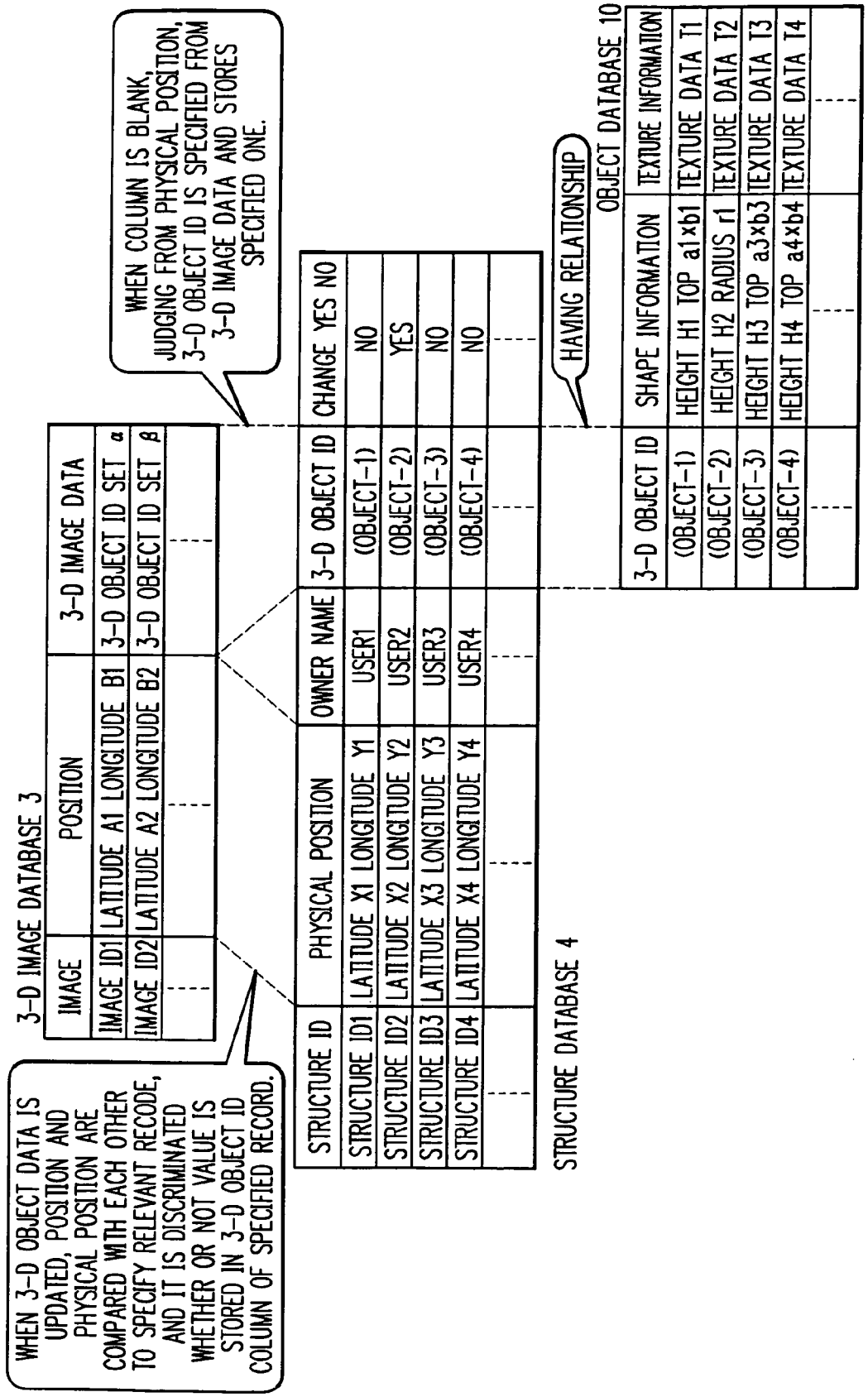
FIG. 9 is a graph showing relationship among a three-dimensional image database, a structure database and an object database, partly shown in FIG. 5.

In this embodiment, the structure changer 7 is constructed in order to reflect data of a structure uploaded using a file transfer protocol (FTP) etc. from the outside, for instance, a particular user (an owner or a manager of the structure) via the Internet to a three-dimensional solid map provided for ordinary users. When receiving the change content about the object from the particular user, the structure changer 7 stores the received content or the three-dimensional object data newly produced from the received content correspondingly to the received structure ID in a change object database 11 shown in FIG. 10. The change object database 11 can be also constructed so as to be stored in the recording medium 203 shown in FIG. 19 or in another recording medium (not shown). When the data about the object is changed by the particular user such as the owner or the manager of the structure, since the three-dimensional object data such as the shape information and the texture information looked up from the three-dimensional image database 3 via the structure database 4 becomes the change object database 11 in FIG. 10, an item showing whether or not a change is made is added to the attribute of the structure database 4. Hence, when the three-dimensional solid map is produced, the change yes no item is checked in the structure database 4. When no change is made, the object database 10 shown in FIG. 9 is looked up, and on the other hand, when the change is make, the change object database 11 is looked up.

The contents of notice given from the outside include the structure ID, the owner name, the shape information of the structure and the texture information of the structure. As to the shape information and the texture information of the structure, the picture of the structure (the picture showing at least the lacking part of the structure on the three-dimensional solid map or the pictures showing the whole of the structure without a dead angle can be used) or the three-dimensional image data of the structure can be used.

However, in this case, when the content sent from the owner or the manager is a picture showing only the lacking part, in order to produce the three-dimensional object data from the received picture, the structure changer 7 obtains the physical position of the structure to be changed from the structure database 4 by using the received structure ID, determines the image ID of the three-dimensional image data including the structure to be changed from the three-dimensional image database 3 by using the obtained physical position, specifies the plural aerial photographs in the image ID database 14 by using the obtained image ID, determines an image area including the photographed structure to be changed from the obtained physical position for the specified plural photographs (a specifying method of this image area: for example, it can be calculated by previously determining an image area sufficiently covering a structure around the physical position), and calculates three-dimensional object data after the change by using the obtained image area and the picture sent from the owner or the manager.

This three-dimensional image data or a reduced scale of the picture is not necessarily adapted to the aerial photographs on the user side, and can be automatically or manually adapted by the structure changer 7 or a similar device instead thereof on the service provider side. Further, this can be specified from the upload side such as the owner or manager side. In addition, in this embodiment, the structure IDs are previously opened to the public (but some structure IDs are opened to only the owners or the managers of the objective structures), and may be indicated by numbers, which are assigned when the structures are constructed or the map is produced. In this embodiment, the particular users capable of uploading the change contents are limited to the owner and the manager of the particular structure to be changed and the persons entrusted with the right of uploading the change contents from the owner or the manager. The construction for this will be hereinafter described in detail.

The structure changer 7 discriminates whether or not the informed structure ID and the structure ID coincident with the owner name are present, or the owner name is present in the structure ID of the structure database 4 and in the owner name column. When the coincident structure ID and the owner name are not present in the discrimination, the structure changer 7 cancels the received shape information and the texture information, and does not perform the update of the three-dimensional object data. On the other hand, when the coincident structure ID and the owner name are present, the structure changer 7 stores the three-dimensional object data produced on the basis of the discrimination result or the received change content correspondingly to the received structure ID in the change object database 11, and also stores the data indicating the change yes in the change yes no column in the record including this structure ID in the structure database 4. Concerning the data indicating the change yes or no, for example, it can be realized by one bit data such as "0" indicating the change no (no change is made) and "1" indicating the change yes (the change is made). Hence, the three-dimensional object data read out when the changed object is produced becomes the three-dimensional object data to be read out of the change object database 11 using the structure ID as a main key. In this configuration, the owner name, in addition to the structure ID, is requested as part of specifying the upload side, and thus this can be changed at need.

The reason why the three-dimensional object data such as the shape information and the texture information of the changed object is stored in the separated change object database 11 is as follows. That is, for example, in the case that the three-dimensional solid map is updated on the basis of the aerial photographs taken every one week, since the new object database 10 is produced every one week, the object database 10 related to the structure database 4 is updated each time using the three-dimensional object ID as the main key and as a result, the shape information and the texture information (also hereinafter referred to as "three-dimensional object data after change") produced on the basis of the change content received from the particular user is invalidated in a cycle of one week. Therefore, in this embodiment, in order to solve this problem, the structure database 4 is newly provided with the change yes no item. Accordingly, when the position input type three-dimensional image output unit 6 or the three-dimensional browser 8 reproduces the three-dimensional solid map, as shown in FIG. 5, the structure database 4 is looked up on the basis of the three-dimensional object ID included in the three-dimensional image data, and the database such as the object database 10 or the change object database 11 to be looked up is selected for reproducing the three-dimensional object on the basis of the change yes or no stored in the change yes no item in the same record.

[Operation Flow of Structure Changer 7]

Figure 7:
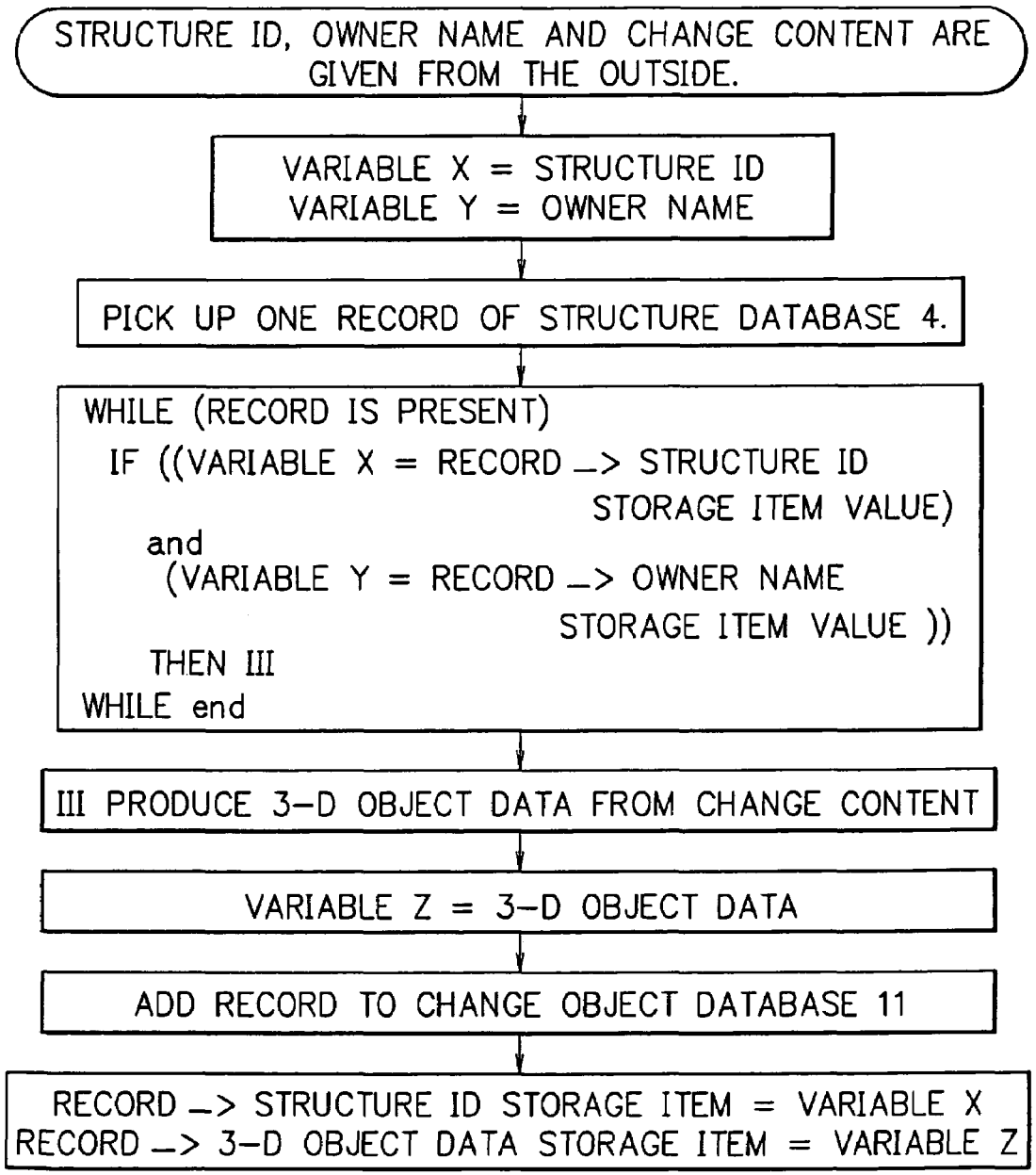
FIG. 7 is a flowchart for showing an operation of a structure changer shown in FIG. 5.

An operation of the structure changer 7 will be described with reference to FIG. 7. FIG. 7 shows only the operation of the structure changer 7.

In FIG. 7, the structure changer 7 is initiated by receiving a structure ID, an owner name (the data stored in the owner name item of the structure database 4) and change content from the outside, for example, a particular user via the Internet.

After the initiation, the structure changer 7 substitutes the received structure ID into a variable X, and the received owner name into a variable Y.

The structure changer 7 then finds the record including the structure ID and the owner name coincident with the substituted variables X and Y, respectively, in the structure database 4. In this process, when the coincident record is specified, the structure changer 7 produces the three-dimensional object data on the basis of the received change content, and substitutes the produced three-dimensional object data into a variable Z. Thereafter, the structure changer 7 adds one more record to the change object database 11, stores the variable X in the item for storing the structure ID of this record and stores the variable Z in the item for storing the three-dimensional object data.

With the operation in this manner, the three-dimensional object data is produced according to the received change content, and is then stored in the change object database 11. However, at this time, the three-dimensional object ID included in the three-dimensional image data is still the previous three-dimensional object ID, and when the three-dimensional solid map is produced, the object is reproduced in the old state before the change. Hence, in this embodiment, in addition to the above-described operation, the structure changer 7 stores the data showing the change yes in the change yes no column of the structure database 4. With this step, the received change content can be reflected on the three-dimensional solid map.

[Three-Dimensional Browser 8]

In this embodiment, a system for improving a three-dimensional air excursion for providing a three-dimensional solid map for users via the Internet further comprising a three-dimensional browser 8 besides the aforementioned basic members such as the three-dimensional image database 3, the structure database 4, the object database 10 and the change object database 11. When first receiving the particular position information from the user via the Internet, the three-dimensional browser 8 sends the received particular position information to the position input type three-dimensional image output unit 6, and in response thereto, receives the three-dimensional image data to store it. For storing this data, the storage device 202 shown in FIG. 19 is used. However, in this embodiment, the present invention is not restricted to this device and various modifications can be made. Then, when receiving the particular viewpoint position information from the user, the three-dimensional browser 8 produces a two-dimensional image of the three-dimensional solid expression seen from the viewpoint position according to the information on the basis of the stored three-dimensional image data, and sends the produced two-dimensional image to the user. Further, when receiving another viewpoint position information from the user, the three-dimensional browser 8 reproduces another two-dimensional image of the three-dimensional solid expression seen from the new viewpoint position of the information, and further sends the newly produced two-dimensional image to the user. This operation is repeated. As a result, the user can move (move his viewpoint) in three-dimensions on the three-dimensional solid map via the three-dimensional browser 8.

Further, when a particular user such as the owner or the manager of a particular structure requests a change of his own structure, the three-dimensional browser 8 transfers its content to the structure changer 7. However, in the aforementioned operation, since the three-dimensional image data input to the three-dimensional browser 8 when the three-dimensional solid map is reproduced is the set of the three-dimensional object IDs, a ground surface image (a basic image) for arranging the three-dimensional object data is required in order to reproduce the three-dimensional solid map, in addition to the three-dimensional object data corresponding to the three-dimensional object IDs. This ground surface image can be read out of an unshown database (a database for storing the ground surface images correspondingly to their positions) to output the readout image by the position input type three-dimensional image output unit 6, or can be read out of the unshown database to output the readout image by another unshown member in response to a request from the three-dimensional browser 8. Furthermore, on the client side shown in FIG. 5, the unshown database is connected to the three-dimensional browser 8, and the ground surface image can be directly read out of the unshown database by the three-dimensional browser 8. Hence, the three-dimensional browser 8 arranges the three-dimensional object data on the readout ground surface image to reproduce the three-dimensional solid map. That is, in this embodiment, the three-dimensional browser 8 reproduces the three-dimensional solid map on the basis of the three-dimensional image data input from the position input type three-dimensional image output unit 6 constructed on the server side, and includes a position information output means for outputting the position information and the viewpoint position information received from the user to the server side and a change content notice means for sending the change content of the structure, received from the user to the server side.

[Operation Flow of Three-Dimensional Browser 8]

An operation of the three-dimensional browser 8 will be described in detail in connection with FIG. 8. In FIG. 8, the three-dimensional browser 8 initiates the operation when receiving the particular photographing position data for an air excursion from a user accessing the three-dimensional browser 8 via the Internet. The position data includes a viewpoint position and a sight line direction.

After starting the operation, the three-dimensional browser 8 sends the received position information to the position input type three-dimensional image output unit 6 and as a result, receives the three-dimensional image data at this position from the position input type three-dimensional image output unit 6. The three-dimensional browser 8 then produces the two-dimensional image data of the three-dimensional solid expression in the sight line direction on the basis of the received three-dimensional image data by using a rendering method or the like, and sends the produced two-dimensional image data to the user. At this time, the three-dimensional browser 8 also obtains the ground surface image corresponding to this position.

Thereafter, the three-dimensional browser 8 awaits an input of a next instruction from the user. When receiving the instruction of the particular viewpoint position from the user, the three-dimensional browser 8 executes the same operation as above, and after that, awaits a next instruction. Besides, when receiving a request of the object change on the three-dimensional solid map from the user, the three-dimensional browser 8 sends the structure ID of the change object and the owner name of the structure included in the request to the structure changer 7. This operation is finished by inputting a stop instruction from the user.

Hence, the user can browse the provided three-dimensional solid map as the two-dimensional image of the three-dimensional solid expression at his terminal via the Internet, and further the particular user such as the owner or the manager can change or correct the image of the structure in the image.

[Relationship among Databases]

In the following, the relationship among the three-dimensional image database 3, the structure database 4 and the object database 10 will be described with reference to FIG. 9. In this embodiment, it is assumed that each of the databases shown in FIG. 9 is configured as a relational database.

As shown in FIG. 9, the three-dimensional image database 3 includes the image (the image ID), the position (the latitude and the longitude) and the three-dimensional image data (a set of three-dimensional object IDs) as its attributes.

The structure database 4 includes the structure ID, the physical position (the latitude and the longitude), the owner name (or the manager name), the three-dimensional object ID and the change yes no as its attributes.

In the system shown in FIG. 1, when the three-dimensional image data is produced from the plural aerial photographs, the produced three-dimensional image data is stored in the three-dimensional image database 3 along with the image ID and the position information of the reference point of the three-dimensional image data. For indicating the position, when the three-dimensional image data to be produced is fixed to, for example, 11 km×11 km square, one point within this square, for example, the latitude and the longitude of its left lower corner are designated. When the range of the three-dimensional image data to be produced and its shape are not fixed, the latitude and the longitude of each vertex of the area included by the three-dimensional image data is designated.

When such information is stored in the three-dimensional image database 3, by the operation shown in FIG. 6, in order to make the three-dimensional object IDs included in the newly stored three-dimensional image data correspond to the three-dimensional object IDs stored in the structure database 4, the structure ID finder 5 specifies the structure IDs of the structures included in the three-dimensional image data on the basis of the physical positions stored in the structure database 4, and updates the three-dimensional object IDs in the records corresponding to the specified structure IDs.

The items about the attributes such as the structure ID, the physical position and the owner name (or the manager name) are previously input on the service manager side. This is because, like in a usual map producing, since each structure such as a building or the like has an identification number, and further the owner (or the manager) and the physical position (exact latitude and longitude) are obvious information, it is useful to use this information for producing the three-dimensional solid map as regards intending links with the actual world in controlling.

Hence, the three-dimensional image database 3 and the structure database 4 are related with each other by using the three-dimensional object IDs as the main key.

Further, when the three-dimensional image data is produced, the three-dimensional object data of the structure corresponding to each three-dimensional object ID is also produced, and is held as a new database (the object database 10). This object database 10, as shown in FIG. 9, includes the three-dimensional object ID, the shape information and the texture information as its attributes.

The three-dimensional IDs are the same as those of the other databases. The shape information and the texture information are the information for reproducing the target object, and in this embodiment, this information is taken as an example. However, the information for reproducing the object is not limited to the shape information and the texture information, and other information can be used without departing from the spirit and scope of the present invention.

Hence, the structure database 4 and the object database 10 are related with each other by using the three-dimensional object IDs as the main key. Concerning the relationship between the three-dimensional image database 3 and the object database 10, the three-dimensional object IDs may be used as the main key.

In the following, the relationship among the three-dimensional image database 3, the structure database 4 and the change object database 11 will be described in detail with reference to FIG. 10. In this embodiment, it is assumed that each of the databases shown in FIG. 10 is configured as a relational database.

As shown in FIG. 10, the change object database 11 includes the structure ID, the shape information and the texture information as its attributes. The shape information and the texture information are produced, as described above, on the basis of the change content received from the user or the three-dimensional object data produced on the basis of the change content.

The structure IDs are the main key also for the relationship between the structure database 4 and the change object database 11. When the structure is reproduced by using the change object database 11, the structure ID is specified by the three-dimensional object ID included in the three-dimensional image data, and the change object database 11 is looked up by using the specified structure ID to reproduce the structure. Further, the determination of whether or not this processing is executed is made by looking up the item indicating change yes no on the same record in the structure database 4.

[Update of Three-Dimensional Object Data]

In this embodiment, an update of three-dimensional object data of an object by a particular user such as an owner or a manager of a particular structure to be updated and a person given an update right from the owner or the manager via the Internet will be described in detail.

[User Authentication]

When the three-dimensional object data on the three-dimensional solid map is updated, first, an updater must be limited from the viewpoint on the service provider side. If the update right is given to all users, the three-dimensional object data can be falsely changed by the image data different from the actual structure or the image data to give the owner disadvantages.

FIG. 11 shows a configuration of a system for authenticating un updater when the updater accesses the system for changing the image of a structure via the Internet.

As shown in FIG. 11, for the user authentication, a three-dimensional browser 8, an authentication processor 9, a structure database 4, an authentication database 12 and a change object database 11 are provided on the service provider side (the service manager side). The authentication database 12 can be provided in the recording medium 203 shown in FIG. 19 or an unshown recording medium. On a changing side (change content sending side), a user terminal 20 is connected to the three-dimensional browser 8 via the Internet 100. In FIG. 11, a structure changer 7, a standard database 13 and the change object database 11 will be hereinafter described in detail in connection with a change content input flow shown in FIG. 15. In the following operation, the three-dimensional browser 8 only converts and transfers the contents communicated between the authentication processor 9 and the user terminal 20 depending on its purposes, and therefore, this intermediation function can be omitted for brevity in the description.

In addition, the authentication processor 9 of FIG. 11 can be realized by the system shown in FIG. 19. That is, a program for executing and operating the authentication processor 9 is stored in the recording medium 203 shown in FIG. 19 or in the unshown recording medium, and when the authentication processor 9 is operated, this program is read out by the data processing device 201. Thus, the work area is ensured in the storage device 202 and the program is executed or operated.

In this embodiment, the structure database 4 has the same construction as that shown in FIG. 9. The authentication database 12 has the data structure shown in FIG. 12. Incidentally, this authentication database 12, like the aforementioned databases, can be configured as a relational database or a normal file type database. In this description, the authentication database 12 is explained as the relational database. The authentication database 12 is related with the structure database 4 by the structure IDs as the main key. The configuration of databases having this relationship will be described with reference to FIG. 12.

As shown in FIG. 12, the authentication database 12 includes the structure ID, a password, an address and an e-mail (electronic mail) address as its attributes. The structure ID is the same as that of the structure database 4. Hence, the structure database 4 and the authentication database 12 are related with each other by the structure IDs as the main key. In addition, as described above in connection with FIG. 10, the relationship between the structure database 4 and the change object database 11 is established by the structure IDs as the main key. Hence, the change yes is indicated in the change yes no column of the structure database 4 on the basis of the structure ID sent from the updating side, and further one record composed of a set of the structure ID and the changed three-dimensional object data can be added to the change object database 11.

Additionally, the address is the address of the structure to be changed and the e-mail address is the contact address of the owner (including the manager and the person given the update right from the owner or the manager) on the updating side.

The password is given from the service provider side when the owner registers at the service provider side in advance that the owner duly possesses the right for updating the three-dimensional object data. As the above-described register procedure of the owner to the service provider side, there is a method in which the user sends the necessary items to be stored in the authentication database 12 to the service provider side via the Internet, and after the validity of the user is verified on the service provider side, the necessary items are stored in the authentication database 12. The register method is not restricted to this and various modifications can be made without departing from the spirit and scope of the present invention.

On the changing side, the particular user accesses the authentication processor 9 from the user terminal 20 via the Internet 100, and sends his password, his name (owner name) and the structure ID assigned to the structure as the change target. On the service provider side, the authentication processor 9 discriminates whether or not the user has the valid update right. In this discrimination, the authentication processor 9 looks up the passwords stored in the authentication database 12 to compare with the received password based on the received structure ID, and also looks up structure database 4 to compare with the received owner name based on the received structure ID.

In the case where the user is verified as the rightful person in the authentication processing, the structure changer 7 is made to execute a change content input flow to produce the three-dimensional object data on the basis of the received change content besides the password, the owner name and the structure ID. The structure changer 7 stores the shape information and the texture information of the produced three-dimensional object data corresponding to the structure ID in the change object database 11. Further, the structure changer 7 stores the data of "change yes" in the change yes no column of the corresponding record of the structure database 4.

The authentication processor 9 can be provided as a server on the service provider side or can be also provided as a client connected to the server. The structure changer 7 can be provided as well. When the system is constructed as client-server architecture, the client and the server are connected via a network such as a LAN (local area network) or the Internet.

Concerning a change content sending method from the user, a picture showing only the lacking part of the structure, or the three-dimensional object data of the structure produced by the user is uploaded. Alternatively, a certain extent of function is provided from the service provider side to the user terminal 20 via the Internet 100 to upload. These methods will be hereinafter described in detail in connection with the operation of the embodiment.

[Operation of First Embodiment]

An operation of a system for realizing a three-dimensional excursion for an ordinary user and a structure image correction service for a particular user on a three-dimensional solid map according to the present invention will be described in detail with reference to the attached figures.

[User Authentication Flow]

First, in this embodiment, the users capable of updating a structure are limited and the valid updaters are registered on the service provider side in advance. An operation of a user authentication processing will be described in detail in connection with FIG. 13. While a user authentication processing and a structure change content input processing are performed in the separated flows in this embodiment, the present invention is not restricted to this and the two processes can be carried out in the same flow.

Figure 13:
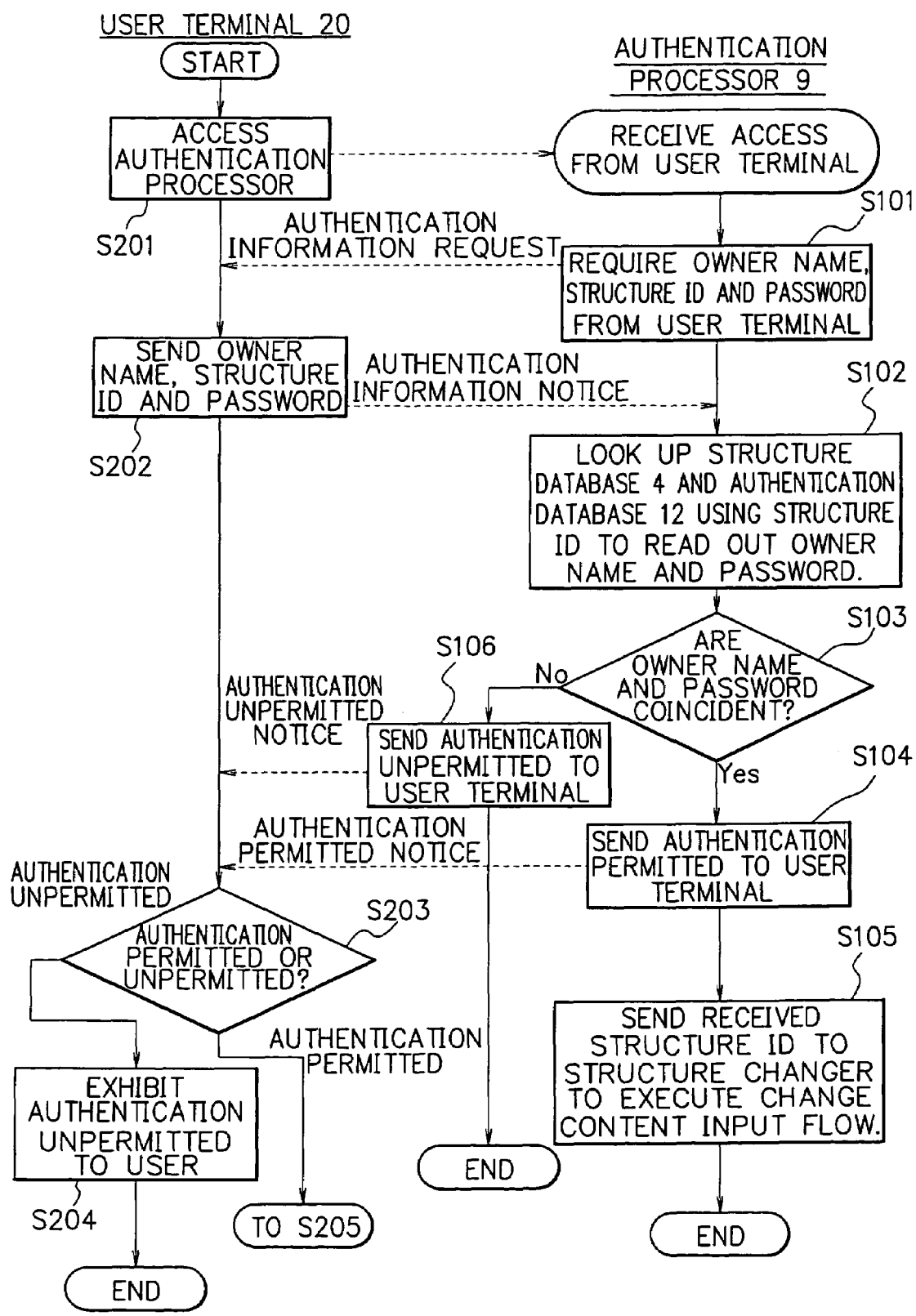
FIG. 13 is a flowchart for showing a user authentication operation performed by the system shown in FIG.

In FIG. 13, a particular user such as an owner, a manager or a person given right for updating a particular structure from the owner or the manager accesses the authentication processor 9 shown in FIG. 11 from the user terminal 20 to initiate the operation in step S201.

The authentication processor 9 then requests the user terminal 20 to send the owner name and the structure ID of the target structure, and the previously given password in step S101. This request can be realized by setting up a home page for inputting the necessary items on the WWW browser of the user terminal 20.

In response to the request of the authentication processor 9, the user inputs the owner name of the structure to be updated, the structure ID and the assigned password to send them to the authentication processor 9 in step S202.

When receiving the owner name, the structure ID and the password from the user terminal 20, the authentication processor 9 looks up the structure database 4 by using the received structure ID to read out the owner name stored in the same record, and further looks up the authentication database 12 to read out the password stored in the same record in step S102.

Thereafter, the authentication processor 9 discriminates whether or not the readout owner name and password are coincident with the owner name and password sent from the user in step S202 in step S15. In this discrimination, when both the owner names and passwords are coincident (step S15 YES), the authentication processor 9 sends the verified result of the user authentication (authentication permitted) to the user terminal 20 in step S104, and sends the received structure ID to the structure changer 7 shown in FIG. 11 via the LAN or the Internet 100 to permit the structure changer 7 to boot an operation for receiving the change content of the structure (change content input flow) sent from the user terminal 20. The authentication processor 9 then finishes a series of operation.

On the other hand, in the discrimination in step S15, at least either of the owner names or the passwords are not coincident (step S15 NO), the authentication processor 9 sends the unverified result of the user authentication (authentication unpermitted) to the user terminal 20 in step S106, and then finishes a series of operation.

The user terminal 20 discriminates which is received from the authentication processor 9, the user authentication permitted or unpermitted in step S203. When receiving the authentication unpermitted (step S203 UNPERMITTED), the user terminal 20 shows the unverified result of the user authentication on the screen in step S204, and finishes a series of operation. On the other hand, when receiving the authentication permitted (step S203 PERMITTED), the operation proceeds to step S205 for dealing with the change content input flow.

[Change Content Input Flow]

After the verified result of the user authentication, in this embodiment, a process flow for inputting the objective structure change content sent from the user and newly storing the shape information and the texture information in the change object database 11 is carried out. This flow will be described in detail in connection with the attached figures. Components that execute each process in this flow are illustrated in FIG. 11. In the present invention, the aforementioned user authentication process can be omitted, and the change content input flow can be directly provided for users. This is useful in the case that there is no limitation on users who provide the change content, and all ordinary users can update the three-dimensional solid map. However, in such configuration, it is desirable that the user first accesses the structure changer 7 via the three-dimensional browser 8 shown in FIG. 11.

As shown in FIG. 11, in this embodiment, the user terminal 20 of the user on the changing side is connected to the structure changer 7 on the service provider side via the three-dimensional browser 8. In the following operation, the three-dimensional browser 8 only converts and transfers the contents communicated between the user terminal 20 and the structure changer 7 depending on its purposes, and in this embodiment, the intermediation function is omitted for brevity in the description.

In FIG. 11, the structure changer 7 is connected to the structure database 4, the change object database 11 and the standard database 13. The standard database 13 can be stored in the recording medium 203 shown in FIG. 19 or in the unshown recording medium. The structure changer 7 specifies the record including the shape information and the texture information for updating the structure in the change object database 11 on the basis of the structure ID sent from the authentication processor 9. The structure changer 7 is connected to the authentication processor 9 via the LAN (not shown) or the Internet 100 to receive the structure ID sent from the authentication processor 9.

In FIG. 11, the standard database 13 connected to the structure changer 7 stores the standard for preventing the change content sent from the user terminal 20 from being larger or smaller than the permitted area to store the structure on the three-dimensional solid map. The data configuration of the standard database 13 is shown in FIG. 14.

[Standard Database 13]

As shown in FIG. 14, the standard database 13 includes the structure ID and the ground area standard as its attributes. The structure ID is the same as that of the structure database 4, and the standard database 13 is related with the structure database 4 by the structure IDs as the main key. The ground area standard indicates the ground area occupied by the structure on the three-dimensional solid map or in the actual world, and is used as the standard when the three-dimensional object data is updated. In this embodiment, when the change content does not extend out of the ground area or become smaller compared to the reduced scale of the three-dimensional solid map, the change content is basically treated as meeting the standard. This standard can be determined more strictly. Further, as to the ground area standard, not only the ground surface is judged but also the area in the vertical direction perpendicular to the ground surface can be used for determining the standard. These processes will be described later in detail.

The change content input process flow using the above-described system will be described in detail with reference to FIG. 15.

Figure 15:
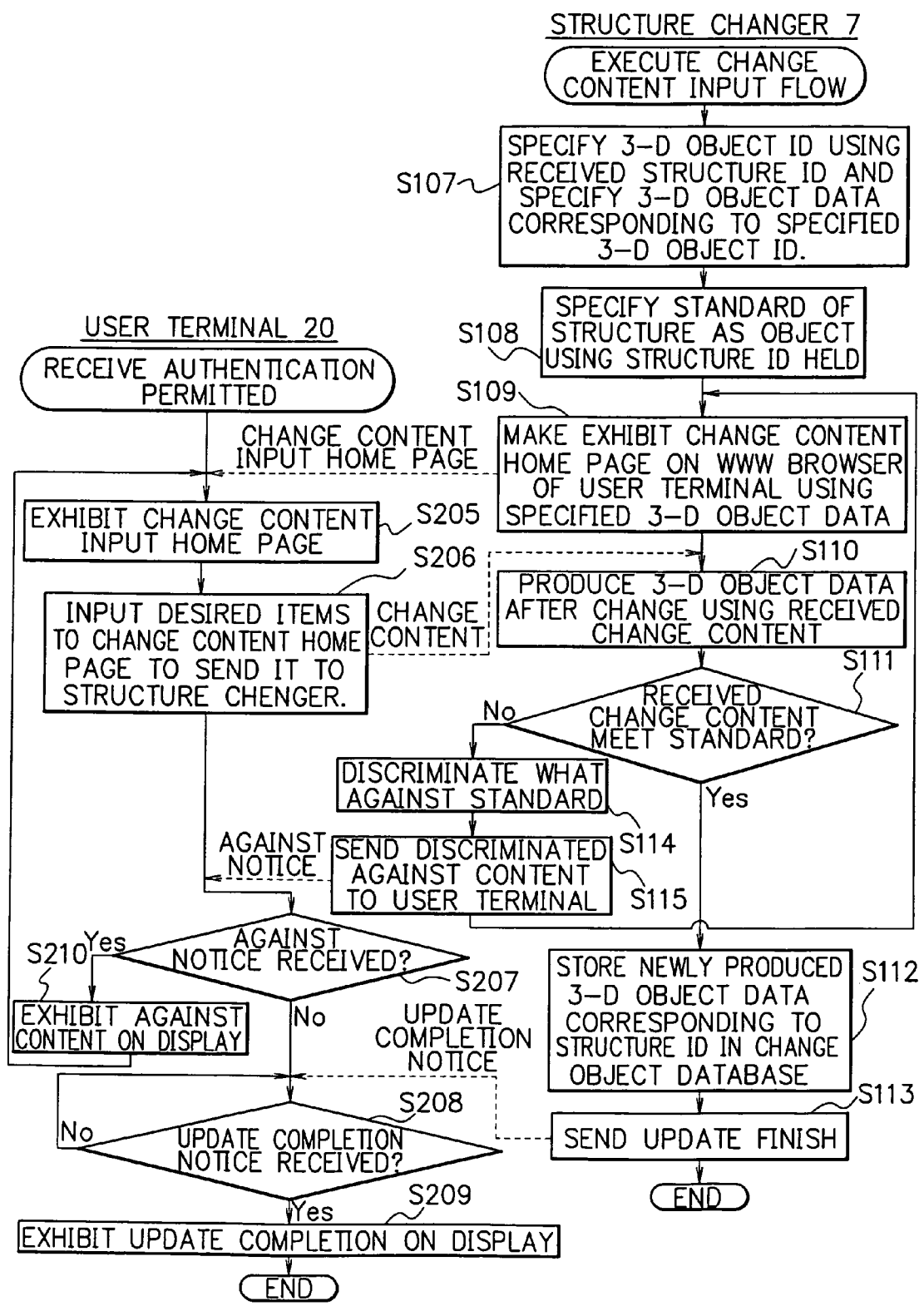
FIG. 15 is a flowchart for showing a change content input operation performed by the system shown in FIG. 11.

In FIG. 15, receiving an instruction for executing the change content input flow from the authentication processor 9, the structure changer 7 on the service provider side first looks up the structure database 4 on the basis of the structure ID sent from the authentication processor 9 to specify the three-dimensional object ID stored in the same record, and further, looks up the object database 10 on the basis of the specified three-dimensional object ID to specify the corresponding three-dimensional object data in step S107.

The structure changer 7 also looks up the standard database 13 using the structure ID to specify the ground area standard of the target structure in step S108. The specified ground area standard is used in the latter part processing.

Thereafter, the structure changer 7 makes the user terminal 20 set up an exclusive home page for inputting the change content by the WWW browser in step S109. At this stage, the access target of the user terminal 20 is moved from the authentication processor 9 to the structure changer 7. This access target change is automatically processed by the authentication processor 9. That is, for the user, the WWW browser is jumped from the home page for inputting the user authentication to the home page for inputting the change content.

When the home page for inputting the change content is set up on the user terminal 20 in step S205, on the changing side, the predetermined items of the change content are input to the setup change content home page, and the input change content is sent to the structure changer 7 in step S206. In this embodiment, the predetermined items of the change content will be described later in detail.

Accordingly, when receiving the change content sent in step S206, the structure changer 7 produces the changed three-dimensional object data on the basis of the received change content in step S21. The producing method of the three-dimensional object data after the change will be described later for every received change content.

After the three-dimensional object data after the change is produced in step S21, the structure changer 7 discriminates whether or not the changed three-dimensional object data meets the ground area standard of the target structure in step S111. The ground area standard to be used at this time has been specified in step S108.

In step S111, when the received change content does not meet the ground area standard of the target structure (step S111 NO), the structure changer 7 specifies a part in the change content, which is against the ground area standard in step S114, and sends the information of the specified part to the user terminal 20 in step S115. The user terminal 20 discriminates whether or not to receive the notice informing the content against the ground area standard in step S207. When receiving the against notice (step S207 YES), the user terminal 20 displays the against content included in the received against notice on a display in step S210, and the flow returns to step S205 for the user to input the change content again. At this time, the structure changer 7 returns to step S21 and allows the user terminal 20 to set up again the home page for inputting the change content.

Then, in step S111, when the received change content meets the ground area standard of the target structure (step S111 YES), the structure changer 7 stores the changed three-dimensional object data (the shape information and the texture information) produced on the basis of the received change content correspondingly to the received structure ID in the change object database 11, and also stores the data indicating the "change yes" in the change yes no column of the record corresponding to the structure to be updated in the structure database 4 in step S112. Thereafter, the structure changer 7 informs the user terminal 20 of the normal finish of the update in step S113, and finishes a series of operation.

The user terminal 20 suspends the operation until the update is normally completed and this result is sent to the user terminal 20 in step S208, and after receiving the completion of the update (step S208 YES), the user terminal 20 displays the finish of the update to give the user this news in step S209, thereby finishing a series of flow.

[Standard Meeting Discrimination Flow]

The standard meeting discrimination flow for discriminating whether or not the change content received in step S111 meets the ground area standard will be described in connection with FIG. 17.

Figure 17:
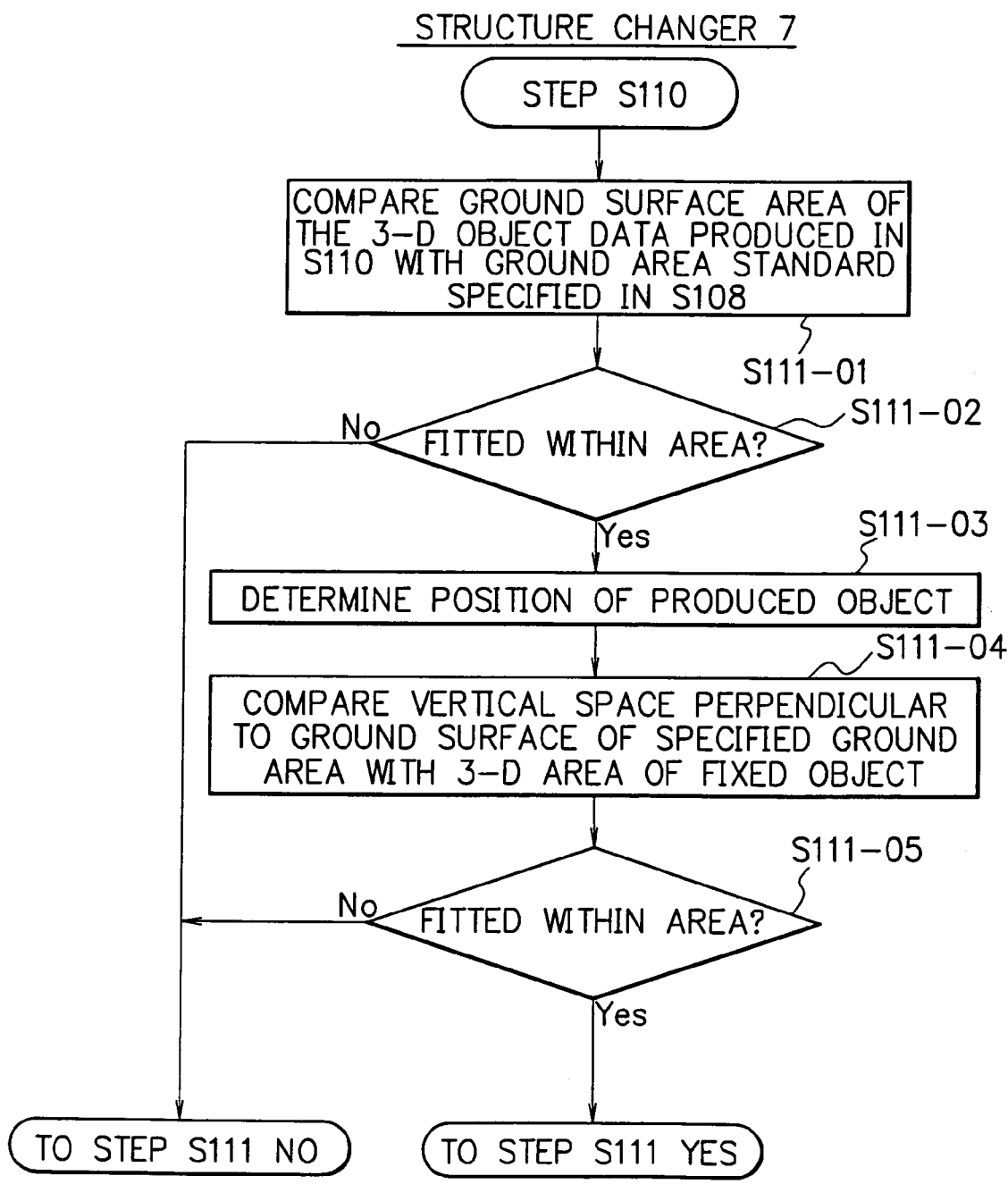
FIG. 17 is a flowchart for showing an operation of step S111 shown in FIG. 15.

FIG. 17 shows the standard meeting discrimination process flow. In FIG. 17, after the three-dimensional object data after the change is produced in step S21 shown in FIG. 15, first, the structure changer 7 compares the ground surface (bottom) area of the changed three-dimensional object data with the ground area standard specified in step S108 in FIG. 15 in step S111-01.

As a result of the comparison in step S111-01, when the ground surface area of the produced object extends out of the ground area standard (step S111-02 NO), the operation of the structure changer 7 follows step S111 NO in FIG. 15. On the other hand, when the ground surface area of the produced object meets the ground area standard (step S111-02 YES), the structure changer 7 determines the position of the produced object, for example, with respect to the ground surface in step S111-03, and then compares the three-dimensional area of the solid form of the object in the determined position with the area in the vertical direction perpendicular to the ground surface of the ground area as the standard in step S111-04.

In the comparison in step S111-04, when the three-dimensional area of the object stretches out of the solid area having the bottom of the ground area standard (step 111-05 NO), the operation of the structure changer 7 follows step S111 NO. On the other hand, in the comparison in step S111-04, when the three-dimensional area of the object does not extend out of the solid area having the bottom of the ground area standard (step 111-05 YES), the operation of the structure changer 7 follows step S111 YES. In step S111 shown in FIG. 15, the processing is carried out as described above.

[Change Content Required of User]

The data for the change content required of user (changing side) will be described with reference to its preferred examples. This requirement is not restricted by the following description and various modifications can be made without departing from the spirit and scope of the present invention.

The data for the change content can be required, as described above, by several methods. For instance, there are a method for requiring the image of only the lacking side of the object, a method for requiring a plurality of images photographed to include all the sides regardless of the lacking side, and a method for requiring the three-dimensional object data produced by the user himself.

[Requiring Only Lacking Side]

A case that the user uploads the image of the lacking side of the object will be described. The user first takes a picture of the object by using a digital camera or an analog camera, and then produces image data from the digital image or the analog image by using a scanner or the like. Then, the user uploads the obtained image data to the structure changer 7 by using a proper protocol such as the FTP. In this embodiment, a home page (the change content input home page) to be used can be readily prepared from a usual home page, and thus the detailed description thereof can be omitted.

Besides, the method for producing the three-dimensional object data of the structure to be changed on the basis of the uploaded image data can be readily realized by the above-described stereographic processing. In this case, regarding the dimensions of the objective building, the values obtained by producing the three-dimensional object data from the plural aerial photographs can be effectively used, and hence the matching or adjustment of the reduced scale and the like becomes out of the problem. Furthermore, when there are the plural number of lacking sides, the plural number of image data of all the lacking sides or one image data covering all the lacking sides can be uploaded to produce the perfect three-dimensional object data. When the stereographic processing is performed based on such image data to produce the three-dimensional object data after the change, the position (the latitude and the longitude) of the photographed area and the distance and the angle to the ground surface are required. This is because these parameters are used for the stereographic processing itself.

In the case of requiring only the lacking side, the image data except the informed side is necessarily specified. For this method, as described above, it is thinkable to perform the following operations. That is, the structure changer 7 determines the physical position of the structure to be changed in the structure database 4 by using the informed structure ID, obtains the image ID of the three-dimensional image data including the target structure from the three-dimensional image database 3 by using the determined physical position, specifies the plural aerial photographs in the image ID database 14 shown in FIG. 16 by using the obtained image ID, and determines the image area including the photographed structure to be changed from the specified plural aerial photographs by using the obtained physical position. In order to specify the image area, for example, a sufficient image area to include the structure is previously determined around the physical position. As a result, the structure changer 7 can obtain the three-dimensional object data after the change by using the determined image area and the received photographs.

Referring to FIG. 16, in this embodiment, the image ID database 14 includes the image ID and the aerial photograph ID as its attributes. The image ID is the same as that of the three-dimensional image database 3. The aerial photograph ID is the ID information assigned to each aerial photograph to be processed when producing the three-dimensional image data. There are several methods for assigning the aerial photograph ID, in which a manager of the server shown in FIG. 5 can assign and input, or the three-dimensional image converter 2 of the server can operate to automatically assign. Alternatively, the position information of the three-dimensional image database 3 can be used as the aerial photograph ID. However, the present invention is not limited to these methods and any information for suitably identifying each aerial photograph can be applicable. Hence, the image ID database 14 constructed as above and the three-dimensional image database 3 are related with each other by the image IDs as the main key.

When updating the three-dimensional object data using the image ID database 14, the structure changer 7 shown in FIG. 11 specifies the physical position of the object to be updated on the basis of the structure ID sent from the user via the authentication processor 9, and also specifies the image ID of the three-dimensional image data including the specified physical position in the three-dimensional image database 3. Then, the structure changer 7 specifies the aerial photograph ID corresponding to the specified image ID in the image ID database 14, and also specifies the area including the object to be updated from the aerial photograph corresponding to the specified aerial photograph ID. Eventually, the structure changer 7 produces the three-dimensional object data after the change by using the image data of the specified area and the image data sent from the user.

[Requiring All Sides]

In the case of requiring at least one number of image data including all the sides of the structure to be updated from the user, the perfect three-dimensional object data can be produced by the stereographic processing in the same manner as the case requiring only the lacking side. In this case, for each image data, the position (the latitude and the longitude) of the photographed area and the distance and the angle to the ground surface are required.

[Requiring Three-Dimensional Object Data]

In the case of requiring the three-dimensional object data already produced in the perfect state from the user, the user uploads the three-dimensional object data produced by any method to the structure changer 7 by using the proper protocol such as the FTP in the same manner as described above. When receiving the three-dimensional object data, the structure changer 7 converts the object according to the three-dimensional object data in consideration of or coincident with the reduced scale of the object, and stores the produced object into the change object database 11 correspondingly to the newly assigned three-dimensional object ID.

In the above-described examples, the shape of the object or the target structure is changed depending on the uploaded change content and becomes against the ground area standard assigned to the structure. In order to cope with this problem, in this embodiment, the processes shown in FIG. 17 are required.

[Requiring Change of Parameters]

The necessary parameters can be input on the home page (the change content input home page) by the user.

Figure 18:
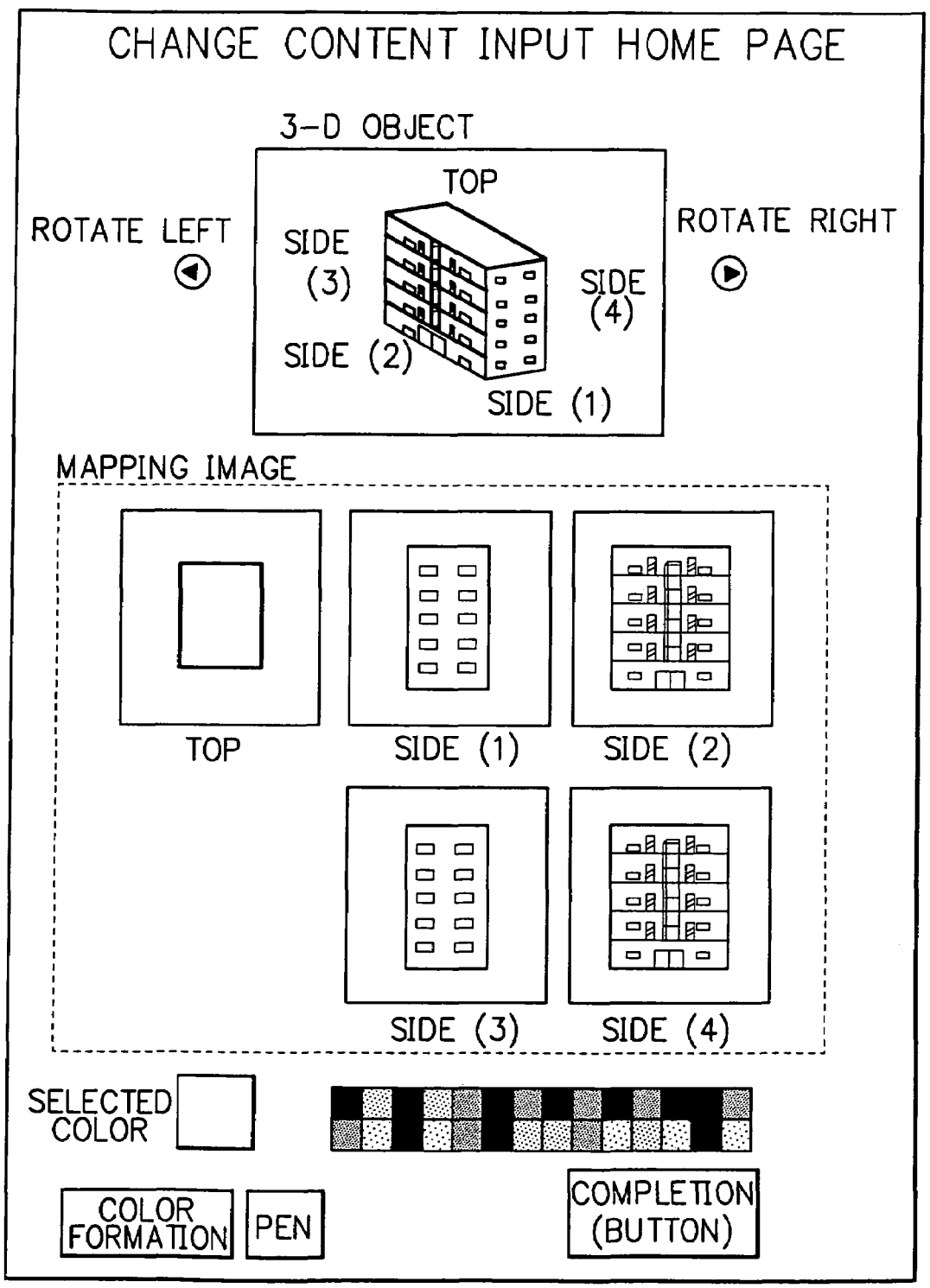
FIG. 18 is a schematic view of a change content input home page according to the first embodiment of the present invention.

Conceivably, the change content input home page may have a configuration shown in FIG. 18.

With reference to FIG. 18, the change content input home page, in which the object is produced by mapping the two-dimensional texture (texture mapping) on the object modeled as a solid, will be explained as an example. In this case, the change content required of the user is revision or correction of the two-dimensional image to be mapped on the object. In the present invention, the correction target on the change content input home page can include not only the texture but also the object to be modeled. In this case, the change content input home page is provided with a function for correcting the newly modeled object. When the function for changing the shape of the object is provided, the adaptability of the correction is judged by the standard meeting discrimination flow shown in FIG. 17.

On the change content input home page, the work area is to be set up in the user terminal 20. After completing the correction, the user can upload the corrected mapping image as the correction content by clicking the "completion" button formed on the home page. Further, it is desirable to use the mapping image produced in the type supported by the user terminal 20. Accordingly, with a function of a plug-in or the like, the user can readily correct the mapping image on the home page.

In this embodiment, the three-dimensional object data is produced on the basis of the uploaded data (change content), and is then stored in the change object database 11 correspondingly to the newly assigned three-dimensional object ID.

As described above, according to the present invention, in a server, a client for improving a three-dimensional air excursion and a method and programs thereof, a three-dimensional data can be automatically produced from aerial pictures or satellite images taken from an airplane or an artificial satellite, and the three-dimensional air excursion can be enjoyed on a three-dimensional solid map. With the use of the aerial pictures or the satellite images, a manual map production can be replaced by an automatic work, and the map information can be readily updated. For example, by using the artificial satellite IKONOS, the update of the whole earth surface can be carried out every week. Hence, the image of the same area, where the field covered with snow last week is completely changed to the green grass field this week, or the tinted autumnal leaves changing every week in autumn can be timely exhibited. Similarly, the change of the eruption state of a volcano can be readily reported every day. As to the update of the related information with map, in the present invention, such up-to-date information can be offered for searching it when a user needs it.

Moreover, in prior art 1 of Japanese Patent No. 2,756,483 entitled "Advertisement information providing method and its registering method", since the related information is previously fastened to the map, when the newest information is provided, the update is always performed manually. This is not practical considering the actual use. In the present invention, this problem can be overcome and the up-to-date information can be always provided for the users.

With the use of this system, the air excursion service can be provided on the Internet. In the case where the satellite images or the aerial photographs cannot be taken successfully, and therefore the three-dimensional image cannot be produced properly, the owner or the manager of this structure may want to correct the three-dimensional image. Further, in the case of a park, a usual landform or the like, when there is no owner or manager in particular, a user of the air excursion via the Internet as a volunteer can want to correct its three-dimensional image to make it look better.

Hence, according to the present invention, when the three-dimensional image is automatically produced using the aerial photographs, and the air excursion service is carried out on the three-dimensional solid map via the Internet, the three-dimensional image database can be improved by the mutual cooperation of the Internet users all over the world.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A client for improving a three-dimensional air excursion, comprising:

a position information output means for outputting position information to a server for improving a three-dimensional air excursion, which stores three-dimensional image data including a three-dimensional object identification for uniquely identifying three-dimensional object data produced by a stereographic processing of photograph data with a correspondence of the three-dimensional image data and a ground surface position in a three-dimensional image database, stores a structure identification for uniquely identifying a structure, a physical position of the structure on a ground surface and a three-dimensional object identification corresponding to the structure, in corresponding state, in a structure database, calculates the physical position of the structure corresponding to the three-dimensional object identification included in the three-dimensional image data from the ground surface position corresponding to the three-dimensional image data, specifies the structure identification in the structure database on the basis of the calculated physical position of the structure and the physical position of the structure in the structure database, and stores the three-dimensional object identification corresponding to the structure with a correspondence of the specified structure identification and the three-dimensional object identification in the structure database; and a three-dimensional browser for having the server output the three-dimensional image data read out of the three-dimensional image database on the basis of the position information and producing a three-dimensional image solid expression from viewpoint position information on the basis of the output three-dimensional image data.

2. A client for improving a three-dimensional air excursion, comprising:

a change content output means for outputting a change content received from a user for updating a structure included in a three-dimensional solid map to a server for improving a three-dimensional air excursion, which executes a stereographic processing of a plurality of photograph data including photographs of the same area shot from different angle points, ground surface positions of photographed areas and camera positions to produce three-dimensional object data, stores three-dimensional image data including a three-dimensional object identification for uniquely identifying the produced three-dimensional object data with a correspondence of the three-dimensional image data and the ground surface position in a three-dimensional image database, and stores a structure identification for uniquely identifying a structure and the three-dimensional object identification corresponding to the structure in a structure database; and a device to make the server produce three-dimensional object data of the structure after its change on the basis of the change content of the structure.

3. A client for improving a three-dimensional air excursion, comprising:

a change content output means for outputting a structure identification for updating a structure included in a three-dimensional solid map to a server for improving a three-dimensional air excursion, which executes a stereographic processing of a plurality of photograph data including photographs of the same area shot from different angle points, ground surface positions of photographed areas and camera positions to produce three-dimensional object data, stores three-dimensional image data including a three-dimensional object identification for uniquely identifying the produced three-dimensional object data with a correspondence of the three-dimensional image data and the ground surface position in a three-dimensional image database, and stores a structure identification for uniquely identifying a structure and the three-dimensional object identification corresponding to the structure in a structure database; having the server read the three-dimensional object data of the structure to be updated out of an object database on the basis of the input structure identification and output the readout three-dimensional object data to the client; presenting the input three-dimensional object data; and outputting a change content of the structure to the server; and a device to make the server produce three-dimensional object data of the structure after its change on the basis of the change content of the structure.

4. A client of claim 3, wherein the structure database includes a change yes no column for showing whether or not the three-dimensional object data after the change is produced by the server, further comprising:

a position information output means for outputting position information input by a user to the server which stores a change yes in the change yes no column of the structure database when producing the three-dimensional object data after the change, stores the three-dimensional object data and the three-dimensional object identification in the object database, and stores the three-dimensional object data after the change and the structure identification in a change object database; an a three-dimensional browser for having the server read the three-dimensional image data out of the three-dimensional image database on the basis of the input position information, look up the change yes no column of the structure database by using the three-dimensional object identification included in the readout three-dimensional image data, extract the three-dimensional object data after the change from the change object database by using the coincident structure identification when the change yes is included in the change yes no column, extract the three-dimensional object data from the object database by using the three-dimensional object identification when the change no is included in the change yes no column and output the extracted three-dimensional object data included in the three-dimensional image data; and producing a three-dimensional image solid expression from the viewpoint position information input by the user on the basis of the received three-dimensional image data.

5. A method for improving a three-dimensional air excursion using a server for improving a three-dimensional air excursion and a client for improving a three-dimensional air excursion, comprising the steps of:

storing three-dimensional image data including a three-dimensional object identification for uniquely identifying three-dimensional object data produced by a stereographic processing of photograph data with a correspondence of the three-dimensional image data and a ground surface position in a three-dimensional image database in the server;

storing a structure identification for uniquely identifying a structure, a physical position of the structure on a ground surface and a three-dimensional object identification corresponding to the structure, in corresponding state, in a structure database in the server;

calculating the physical position of the structure corresponding to the three-dimensional object identification included in the three-dimensional image data, specifying the structure identification of the structure database on the basis of the calculated physical position and the physical position of the structure in the structure database, and storing the three-dimensional object identification corresponding to the structure, corresponding to the specified structure identification by a structure identification finding means in the structure database in the server;

outputting position information to the server by a position information output means in the client;

reading the three-dimensional image data out of the three-dimensional image database on the basis of the position information sent from the client and outputting the readout three-dimensional image data by a position input type three-dimensional image output means in the server; and producing a three-dimensional image solid expression from input viewpoint position information on the basis of the three-dimensional image data sent from the position input type three-dimensional image output means by the client.

6. A method of claim 5, wherein the structure database includes a change yes no column for showing whether or not the three-dimensional object data after the change is produced by the structure changing means, wherein the structure changing means stores a change yes in the change yes no column of the structure database when producing the three-dimensional object data after the change, further comprising the steps of:

storing the three-dimensional object data and the three-dimensional object identification in an object database in the server;

storing the three-dimensional object data after the change and the structure identification in a change object database in the server;

outputting the position information input by the user to the server by a position information output means in the client;

reading the three-dimensional image data out of the three-dimensional image database on the basis of the input position information, looking up the change yes no column of the structure database by using the three-dimensional object identification included in the readout three-dimensional image data, extracting the three-dimensional object data after the change from the change object database by using the coincident structure identification when the change yes is included in the change yes no column, extracting the three-dimensional object data from the object database by using the three-dimensional object identification when the change no is included in the change yes no column, and outputting the extracted three-dimensional object data included in the three-dimensional image data by a position input type three-dimensional image output means in the server; and producing a three-dimensional image solid expression from the viewpoint position information input by the user on the basis of the three-dimensional image data sent from the position input type three-dimensional image output means by a three-dimensional browser in the client.

7. A method of claim 6, further comprising the steps of:
storing the physical position of the structure on the ground surface in the structure database; and
calculating the physical position of the structure corresponding to the three-dimensional object identification included in the three-dimensional image data on the basis of the ground surface position corresponding to the three-dimensional image data, specifying the structure identification of the structure database on the basis of the calculated physical position and the physical position of the structure in the structure database, and storing the three-dimensional object identification corresponding to the structure, corresponding to the specified structure identification by a structure identification finding means in the server.

8. A method of claim 6, wherein the change content of the structure includes image data including at least one side to be changed for an objective structure, a ground surface position of a photographed area and a camera position, further comprising the steps of:
outputting the structure identification of the structure to be updated to the server by the change content output means in the client; and
specifying the photograph data including the structure on the basis of the structure identification input by the client and newly producing the three-dimensional object data after the change on the basis of the specified photograph data and the input image data by the structure changing means in the server.

9. A method of claim 6, wherein the change content of the structure to be changed includes image data including all sides for an objective structure, a ground surface position of a photographed area and a camera position, further comprising the step of newly producing the three-dimensional object data after the change on the basis of the input image data by the structure changing means.

10. A method of claim 6, wherein the three-dimensional object data and the three-dimensional object data after the change include shape information representing a size and a shape of the structure and texture information representing a texture mapped to each side of the structure, wherein the change content of the structure is about the shape information and the texture information.

11. A method of claim 6, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

12. A method of claim 6, further comprising the step of executing the stereographic processing of the photograph data and producing the three-dimensional image data including the three-dimensional object identification for uniquely identifying the produced three-dimensional object data by a three-dimensional image converting means in the server.

13. A method of claim 6, wherein the photograph data is either an aerial photograph or a satellite image taken from an upper air.

14. A method of claim 5, further comprising the steps of:
storing the physical position of the structure on the ground surface in the structure database; and
calculating the physical position of the structure corresponding to the three-dimensional object identification included in the three-dimensional image data on the basis of the ground surface position corresponding to the three-dimensional image data, specifying the structure identification of the structure database on the basis of the calculated physical position and the physical position of the structure in the structure database, and storing the three-dimensional object identification corresponding to the structure, corresponding to the specified structure identification by a structure identification finding means in the server.

15. A method of claim 14, wherein the change content of the structure includes image data including at least one side to be changed for an objective structure, a ground surface position of a photographed area and a camera position, further comprising the steps of:
outputting the structure identification of the structure to be updated to the server by the change content output means in the client; and
specifying the photograph data including the structure on the basis of the structure identification input by the client and newly producing the three-dimensional object data after the change on the basis of the specified photograph data and the input image data by the structure changing means in the server.

16. A method of claim 14, wherein the change content of the structure to be changed includes image data including all sides for an objective structure, a ground surface position of a photographed area and a camera position, further comprising the step of newly producing the three-dimensional object data after the change on the basis of the input image data by the structure changing means.

17. A method of claim 14, wherein the three-dimensional object data and the three-dimensional object data after the change include shape information representing a size and a shape of the structure and texture information representing a texture mapped to each side of the structure, wherein the change content of the structure is about the shape information and the texture information.

18. A method of claim 14, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

19. A method of claim 14, further comprising the step of executing the stereographic processing of the photograph data and producing the three-dimensional image data including the three-dimensional object identification for uniquely identifying the produced three-dimensional object data by a three-dimensional image converting means in the server.

20. A method of claim 14, wherein the photograph data is either an aerial photograph or a satellite image taken from an upper air.

21. A method of claim 5, wherein the change content of the structure includes image data including at least one side to be changed for an objective structure, a ground surface position of a photographed area and a camera position, further comprising the steps of:
outputting the structure identification of the structure to be updated to the server by the change content output means in the client; and
specifying the photograph data including the structure on the basis of the structure identification input by the client and newly producing the three-dimensional object data after the change on the basis of the specified photograph data and the input image data by the structure changing means in the server.

22. A method of claim 21, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

23. A method of claim 21, further comprising the step of executing the stereographic processing of the photograph data and producing the three-dimensional image data including the three-dimensional object identification for uniquely identifying the produced three-dimensional object data by a three-dimensional image converting means in the server.

24. A method of claim 21, wherein the photograph data is either an aerial photograph or a satellite image taken from an upper air.

25. A method of claim 5, wherein the change content of the structure to be changed includes image data including all sides for an objective structure, a ground surface position of a photographed area and a camera position, further comprising the step of newly producing the three-dimensional object data after the change on the basis of the input image data by the structure changing means.

26. A method of claim 25, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

27. A method of claim 25, further comprising the step of executing the stereographic processing of the photograph data and producing the three-dimensional image data including the three-dimensional object identification for uniquely identifying the produced three-dimensional object data by a three-dimensional image converting means in the server.

28. A method of claim 25, wherein the photograph data is either an aerial photograph or a satellite image taken from an upper air.

29. A method of claim 5, wherein the three-dimensional object data and the three-dimensional object data after the change include shape information representing a size and a shape of the structure and texture information representing a texture mapped to each side of the structure, wherein the change content of the structure is about the shape information and the texture information.

30. A method of claim 29, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

31. A method of claim 29, further comprising the step of executing the stereographic processing of the photograph data and producing the three-dimensional image data including the three-dimensional object identification for uniquely identifying the produced three-dimensional object data by a three-dimensional image converting means in the server.

32. A method of claim 29, wherein the photograph data is either an aerial photograph or a satellite image taken from an upper air.

33. A method of claim 5, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

34. A method of claim 33, wherein the ground area standard is the ground surface area of the three-dimensional solid map storing the structure, further comprising the step of determining whether or not the three-dimensional object data after the change meets the ground area standard by discriminating whether or not the three-dimensional object data after the change is within a certain area of the ground surface area by the structure changing means.

35. A method of claim 34, further comprising the step of executing the stereographic processing of the photograph data and producing the three-dimensional image data including the three-dimensional object identification for uniquely identifying the produced three-dimensional object data by a three-dimensional image converting means in the server.

36. A method of claim 34, wherein the photograph data is either an aerial photograph or a satellite image taken from an upper air.

37. A method of claim 33, wherein the ground area standard is the ground surface area of the three-dimensional solid map storing the structure, further comprising the step of determining whether or not the three-dimensional object data after the change meets the ground area standard by discriminating whether or not the three-dimensional object data after the change is within a certain area of a solid area produced by moving the ground surface area in a direction perpendicular to the ground by the structure changing means.

38. A method of claim 37, further comprising the step of executing the stereographic processing of the photograph data and producing the three-dimensional image data including the three-dimensional object identification for uniquely identifying the produced three-dimensional object data by a three-dimensional image converting means in the server.

39. A method of claim 37, wherein the photograph data is either an aerial photograph or a satellite image taken from an upper air.

40. A method of claim 33, further comprising the step of executing the stereographic processing of the photograph data and producing the three-dimensional image data including the three-dimensional object identification for uniquely identifying the produced three-dimensional object data by a three-dimensional image converting means in the server.

41. A method of claim 33, wherein the photograph data is either an aerial photograph or a satellite image taken from an upper air.

42. A method of claim 5, further comprising the step of executing the stereographic processing of the photograph data and producing the three-dimensional image data including the three-dimensional object identification for uniquely identifying the produced three-dimensional object data by a three-dimensional image converting means in the server.

43. A method of claim 42, wherein the photograph data is either an aerial photograph or a satellite image taken from an upper air.

44. A method of claim 5, wherein the photograph data is either an aerial photograph or a satellite image taken from an upper air.

45. A method for improving a three-dimensional air excursion using a server for improving a three-dimensional air excursion and a client for improving a three-dimensional air excursion, comprising the steps of:
   executing a stereographic processing of a plurality of photograph data including photographs of the same area shot from different angle points, ground surface positions of photographed areas and camera positions to produce three-dimensional object data, and storing three-dimensional image data including a three-dimensional object identification for uniquely identifying the produced three-dimensional object data with a correspondence of the three-dimensional image data and the ground surface position in a three-dimensional image database in the server;
   storing a structure identification for uniquely identifying a structure and the three-dimensional object identification corresponding to the structure in a structure database in the server;
   outputting a change content received from a user for updating the structure included in a three-dimensional solid map to the server by a change content output means in the client; and
   producing the three-dimensional object data of the structure after the change on the basis of the input change content of the structure by a structure changing means in the server.

46. A method of claim 45, wherein the structure database includes a change yes no column for showing whether or not the three-dimensional object data after the change is produced by the structure changing means, wherein the structure changing means stores a change yes in the change yes no column of the structure database when producing the three-dimensional object data after the change, further comprising the steps of:
   storing the three-dimensional object data and the three-dimensional object identification in an object database in the server;
   storing the three-dimensional object data after the change and the structure identification in a change object database in the server;
   outputting the position information input by the user to the server by a position information output means in the client;
   reading the three-dimensional image data out of the three-dimensional image database on the basis of the input position information, looking up the change yes no column of the structure database by using the three-dimensional object identification included in the readout three-dimensional image data, extracting the three-dimensional object data after the change from the change object database by using the coincident structure identification when the change yes is included in the change yes no column, extracting the three-dimensional object data from the object database by using the three-dimensional object identification when the change no is included in the change yes no column, and outputting the extracted three-dimensional object data included in the three-dimensional image data by a position input type three-dimensional image output means in the server; and
   producing a three-dimensional image solid expression from the viewpoint position information input by the user on the basis of the three-dimensional image data sent from the position input type three-dimensional image output means by a three-dimensional browser in the client.

47. A method of claim 45, further comprising the steps of:
   storing the physical position of the structure on the ground surface in the structure database; and
   calculating the physical position of the structure corresponding to the three-dimensional object identification included in the three-dimensional image data on the basis of the ground surface position corresponding to the three-dimensional image data, specifying the structure identification of the structure database on the basis of the calculated physical position and the physical position of the structure in the structure database, and storing the three-dimensional object identification corresponding to the structure, corresponding to the specified structure identification by a structure identification finding means in the server.

48. A method of claim 45, wherein the change content of the structure includes image data including at least one side to be changed for an objective structure, a ground surface position of a photographed area and a camera position, further comprising the steps of:
   outputting the structure identification of the structure to be updated to the server by the change content output means in the client; and
   specifying the photograph data including the structure on the basis of the structure identification input by the client and newly producing the three-dimensional object data after the change on the basis of the specified photograph data and the input image data by the structure changing means in the server.

49. A method of claim 45, wherein the change content of the structure to be changed includes image data including all sides for an objective structure, a ground surface position of a photographed area and a camera position, further comprising the step of newly producing the three-dimensional object data after the change on the basis of the input image data by the structure changing means.

50. A method of claim 45, wherein the three-dimensional object data and the three-dimensional object data after the change include shape information representing a size and a shape of the structure and texture information representing a texture mapped to each side of the structure, wherein the change content of the structure is about the shape information and the texture information.

51. A method of claim 45, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

52. A method of claim 45, further comprising the step of executing the stereographic processing of the photograph data and producing the three-dimensional image data including the three-dimensional object identification for uniquely identifying the produced three-dimensional object data by a three-dimensional image converting means in the server.

53. A method of claim 45, wherein the photograph data is either an aerial photograph or a satellite image taken from an upper air.

54. A method for improving a three-dimensional air excursion using a server for improving a three-dimensional air excursion and a client for improving a three-dimensional air excursion, comprising the steps of:
executing a stereographic processing of a plurality of photograph data including photographs of the same area shot from different angle points, ground surface positions of photographed areas and camera positions to produce three-dimensional object data, and storing three-dimensional image data including a three-dimensional object identification for uniquely identifying the produced three-dimensional object data with a correspondence of the three-dimensional image data and the ground surface position in a three-dimensional image database in the server;
storing a structure identification for uniquely identifying a structure and the three-dimensional object identification corresponding to the structure in a structure database in the server;
outputting a structure identification for updating a structure included in a three-dimensional solid map to the server by a change content output means in the client;
reading the three-dimensional object data of the structure to be updated out of an object database on the basis of the input structure identification to output the readout three-dimensional object data to the client by a structure changing means in the server;
presenting the input three-dimensional object and outputting a change content of the structure to the server by the change content output means in the client; and
producing the three-dimensional object data of the structure after the change on the basis of the input change content of the structure by the structure changing means in the server.

55. A method of claim 54, wherein the structure database includes a change yes no column for showing whether or not the three-dimensional object data after the change is produced by the structure changing means, wherein the structure changing means stores a change yes in the change yes no column of the structure database when producing the three-dimensional object data after the change, further comprising the steps of:
storing the three-dimensional object data and the three-dimensional object identification in an object database in the server;
storing the three-dimensional object data after the change and the structure identification in a change object database in the server;
outputting the position information input by the user to the server by a position information output means in the client;
reading the three-dimensional image data out of the three-dimensional image database on the basis of the input position information, looking up the change yes no column of the structure database by using the three-dimensional object identification included in the readout three-dimensional image data, extracting the three-dimensional object data after the change from the change object database by using the coincident structure identification when the change yes is included in the change yes no column, extracting the three-dimensional object data from the object database by using the three-dimensional object identification when the change no is included in the change yes no column, and outputting the extracted three-dimensional object data included in the three-dimensional image data by a position input type three-dimensional image output means in the server; and
producing a three-dimensional image solid expression from the viewpoint position information input by the user on the basis of the three-dimensional image data sent from the position input type three-dimensional image output means by a three-dimensional browser in the client.

56. A method of claim 7, further comprising the steps of:
storing the physical position of the structure on the ground, surface in the structure database; and
calculating the physical position of the structure corresponding to the three-dimensional object identification included in the three-dimensional image data on the basis of the ground surface position corresponding to the three-dimensional image data, specifying the structure identification of the structure database on the basis of the calculated physical position and the physical position of the structure in the structure database, and storing the three-dimensional object identification corresponding to the structure, corresponding to the specified structure identification by a structure identification finding means in the server.

57. A method of claim 54, wherein the change content of the structure includes image data including at least one side to be changed for an objective structure, a ground surface position of a photographed area and a camera position, further comprising the steps of:
outputting the structure identification of the structure to be updated to the server by the change content output means in the client; and
specifying the photograph data including the structure on the basis of the structure identification input by the client and newly producing the three-dimensional object data after the change on the basis of the specified photograph data and the input image data by the structure changing means in the server.

58. A method of claim 54, wherein the change content of the structure to be changed includes image data including all sides for an objective structure, a ground surface position of a photographed area and a camera position, further comprising the step of newly producing the three-dimensional object data after the change on the basis of the input image data by the structure changing means.

59. A method of claim 54, wherein the three-dimensional object data and the three-dimensional object data after the change include shape information representing a size and a shape of the structure and texture information representing a texture mapped to each side of the structure, wherein the change content of the structure is about the shape information and the texture information.

60. A method of claim 54, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

61. A method of claim 54, further comprising the step of executing the stereographic processing of the photograph data and producing the three-dimensional image data including the three-dimensional object identification for uniquely identifying the produced three-dimensional object data by a three-dimensional image converting means in the server.

62. A method of claim 54, wherein the photograph data is either an aerial photograph or a satellite image taken from an upper air.

63. A method for improving a three-dimensional air excursion using a server for improving a three-dimensional air excursion and a client for improving a three-dimensional air excursion, comprising the steps of:
executing a stereographic processing of a plurality of photograph data including photographs of the same area shot from different angle points, ground surface positions of photographed areas and camera positions to produce three-dimensional object data, and storing three-dimensional image data including a three-dimensional object identification for uniquely identifying the produced three-dimensional object data with a correspondence of the three-dimensional image data and the ground surface position in a three-dimensional image database in the server;
storing a structure identification for uniquely identifying a structure, the three-dimensional object identification corresponding to the structure and an owner name of the structure in a structure database in the server;
outputting a change content of the structure, sent from a user, for updating the structure included in a three-dimensional solid map, the structure identification of the structure and the owner name of the structure to the server by a change content output means in the client;
executing a user authentication by using the input structure identification and the owner name of the structure by an authentication processing means in the server; and
producing the three-dimensional object data of the structure after the change on the basis of the input change content of the structure by a structure changing means in the server.

64. A method of claim 63, wherein the structure database includes a change yes no column for showing whether or not the three-dimensional object data after the change is produced by the structure changing means, wherein the structure changing means stores a change yes in the change yes no column of the structure database when producing the three-dimensional object data after the change, further comprising the steps of:
storing the three-dimensional object data and the three-dimensional object identification in an object database in the server;
storing the three-dimensional object data after the change and the structure identification in a change object database in the server;
outputting the position information input by the user to the server by a position information output means in the client;
reading the three-dimensional image data out of the three-dimensional image database on the basis of the input position information, looking up the change yes no column of the structure database by using the three-dimensional object identification included in the readout three-dimensional image data, extracting the three-dimensional object data after the change from the change object database by using the coincident structure identification when the change yes is included in the change yes no column, extracting the three-dimensional object data from the object database by using the three-dimensional object identification when the change no is included in the change yes no column, and outputting the extracted three-dimensional object data included in the three-dimensional image data by a position input type three-dimensional image output means in the server; and
producing a three-dimensional image solid expression from the viewpoint position information input by the user on the basis of the three-dimensional image data sent from the position input type three-dimensional image output means by a three-dimensional browser in the client.

65. A method of claim 53, further comprising the steps of:
storing the physical position of the structure on the ground surface in the structure database; and
calculating the physical position of the structure corresponding to the three-dimensional object identification included in the three-dimensional image data on the basis of the ground surface position corresponding to the three-dimensional image data, specifying the structure identification of the structure database on the basis of the calculated physical position and the physical position of the structure in the structure database, and storing the three-dimensional object identification corresponding to the structure, corresponding to the specified structure identification by a structure identification finding means in the server.

66. A method of claim 53, wherein the change content of the structure includes image data including at least one side to be changed for an objective structure, a ground surface position of a photographed area and a camera position, further comprising the steps of:
outputting the structure identification of the structure to be updated to the server by the change content output means in the client; and
specifying the photograph data including the structure on the basis of the structure identification input by the client and newly producing the three-dimensional object data after the change on the basis of the specified photograph data and the input image data by the structure changing means in the server.

67. A method of claim 53, wherein the change content of the structure to be changed includes image data including all sides for an objective structure, a ground surface position of a photographed area and a camera position, further comprising the step of newly producing the three-dimensional object data after the change on the basis of the input image data by the structure changing means.

68. A method of claim 53, wherein the three-dimensional object data and the three-dimensional object data after the change include shape information representing a size and a shape of the structure and texture information representing a texture mapped to each side of the structure, wherein the change content of the structure is about the shape information and the texture information.

69. A method of claim 53, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

70. A method of claim 53, further comprising the step of executing the stereographic processing of the photograph data and producing the three-dimensional image data including the three-dimensional object identification for uniquely identifying the produced three-dimensional object data by a three-dimensional image converting means in the server.

71. A method of claim 53, wherein the photograph data is either an aerial photograph or a satellite image taken from an upper air.

72. A method for improving a three-dimensional air excursion using a server for improving a three-dimensional air excursion and a client for improving a three-dimensional air excursion, comprising the steps of:
executing a stereographic processing of a plurality of photograph data including photographs of the same area shot from different angle points, ground surface positions of photographed areas and camera positions to produce three-dimensional object data, and storing three-dimensional image data including a three-dimensional object identification for uniquely identifying the produced three-dimensional object data with a correspondence of the three-dimensional image data and the ground surface position in a three-dimensional image database in the server;
storing a structure identification for uniquely identifying a structure and the three-dimensional object identification corresponding to the structure in a structure database in the server;
storing a password registered by a user corresponding to each structure identification in an authentication database in the server;
outputting a change content of the structure, sent from the user, for updating the structure included in a three-dimensional solid map, at least the structure identification and the password to the server by a change content output means in the client;
specifying the corresponding password in the authentication database by using the input structure identification and executing a user authentication by using the specified password by an authentication processing means in the server; and
producing the three-dimensional object data of the structure after the change on the basis of the input change content of the structure by a structure changing means in the server.

73. A method of claim 9, wherein the structure database includes a change yes no column for showing whether or not the three-dimensional object data after the change is produced by the structure changing means, wherein the structure changing means stores a change yes in the change yes no column of the structure database when producing the three-dimensional object data after the change, further comprising the steps of:
storing the three-dimensional object data and the three-dimensional object identification in an object database in the server;
storing the three-dimensional object data after the change and the structure identification in a change object database in the server;
outputting the position information input by the user to the server by a position information output means in the client;
reading the three-dimensional image data out of the three-dimensional image database on the basis of the input position information, looking up the change yes no column of the structure database by using the three-dimensional object identification included in the readout three-dimensional image data, extracting the three-dimensional object data after the change from the change object database by using the coincident structure identification when the change yes is included in the change yes no column, extracting the three-dimensional object data from the object database by using the three-dimensional object identification when the change no is included in the change yes no column, and outputting the extracted three-dimensional object data included in the three-dimensional image data by a position input type three-dimensional image output means in the server; and
producing a three-dimensional image solid expression from the viewpoint position information input by the user on the basis of the three-dimensional image data sent from the position input type three-dimensional image output means by a three-dimensional browser in the client.

74. A method of claim 72, further comprising the steps of:
storing the physical position of the structure on the ground surface in the structure database; and
calculating the physical position of the structure corresponding to the three-dimensional object identification included in the three-dimensional image data on the basis of the ground surface position corresponding to the three-dimensional image data, specifying the structure identification of the structure database on the basis of the calculated physical position and the physical position of the structure in the structure database, and storing the three-dimensional object identification corresponding to the structure, corresponding to the specified structure identification by a structure identification finding means in the server.

75. A method of claim 72, wherein the change content of the structure includes image data including at least one side to be changed for an objective structure, a ground surface position of a photographed area and a camera position, further comprising the steps of:
outputting the structure identification of the structure to be updated to the server by the change content output means in the client; and
specifying the photograph data including the structure on the basis of the structure identification input by the client and newly producing the three-dimensional object data after the change on the basis of the specified photograph data and the input image data by the structure changing means in the server.

76. A method of claim 72, wherein the change content of the structure to be changed includes image data including all sides for an objective structure, a ground surface position of a photographed area and a camera position, further comprising the step of newly producing the three-dimensional object data after the change on the basis of the input image data by the structure changing means.

77. A method of claim 72, wherein the three-dimensional object data and the three-dimensional object data after the change include shape information representing a size and a shape of the structure and texture information representing a texture mapped to each side of the structure, wherein the change content of the structure is about the shape information and the texture information.

78. A method of claim 72, further comprising the steps of:
storing a ground area standard of the structure on the three-dimensional solid map, corresponding to the three-dimensional object identification in a standard database, discriminating whether or not the three-dimensional object data produced after the change meets the ground area standard; and
storing the three-dimensional object data after the change in the change object database when the three-dimensional object data after the change meets the ground area standard by the structure changing means.

79. A method of claim 72, further comprising the step of executing the stereographic processing of the photograph data and producing the three-dimensional image data including the three-dimensional object identification for uniquely identifying the produced three-dimensional object data by a three-dimensional image converting means in the server.

80. A method of claim 72, wherein the photograph data is either an aerial photograph or a satellite image taken from an upper air.

81. A computer-readable media having stored therein a computer program product, the computer program product, when executed by a computer corresponding to a client, enabling the client for improving a three-dimensional air excursion to execute processes of:

outputting position information to a server storing three-dimensional image data including a three-dimensional object identification for uniquely identifying three-dimensional object data produced by a stereographic processing of photograph data with a correspondence of the three-dimensional image data and a ground surface position in a three-dimensional image database, storing a structure identification for uniquely identifying a structure, a physical position of the structure on a ground surface and a three-dimensional object identification corresponding to the structure, in corresponding state, in a structure database, calculating the physical position of the structure corresponding to the three-dimensional object identification included in the three-dimensional image data from the ground surface position corresponding to the three-dimensional image data, specifying the structure identification in the structure database on the basis of the calculated physical position of the structure and the physical position of the structure in the structure database, and storing the three-dimensional object identification corresponding to the structure with a correspondence of the specified structure identification and the three-dimensional object identification in the structure database, by a position information output means; and having the server output the three-dimensional image data read out of the three-dimensional image database on the basis of the position information, and thereby producing a three-dimensional image solid expression from viewpoint position information on the basis of the output three-dimensional image data by a three-dimensional browser.

* * * * *